United States Patent
Park

(10) Patent No.: US 9,774,812 B1
(45) Date of Patent: Sep. 26, 2017

(54) IMAGE PROCESSING TERMINAL AND METHOD FOR PROVIDING A SERVICE BASED ON SENSING LEVELS OF A KEY IN A REMOTE CONTROLLER

(71) Applicant: HUMAX CO., LTD., Yongin (KR)

(72) Inventor: Sung Heum Park, Yongin (KR)

(73) Assignee: HUMAX CO., LTD., Yongin (KR)

(*) Notice: Subject to any disclaimer, the term of this patent is extended or adjusted under 35 U.S.C. 154(b) by 0 days.

(21) Appl. No.: 15/248,821

(22) Filed: Aug. 26, 2016

(30) Foreign Application Priority Data

Mar. 23, 2016 (KR) .......................... 10-2016-0034577

(51) Int. Cl.
*H04N 5/44* (2011.01)
*H04N 5/45* (2011.01)

(52) U.S. Cl.
CPC ............. *H04N 5/4403* (2013.01); *H04N 5/45* (2013.01)

(58) Field of Classification Search
USPC ....... 348/734, 706, 714, 719, 725, 739, 523, 348/565, 567, 585, 590, 684, 425.4, 474, 348/211.14, 231.6, 231.1, 298, 43; 345/169, 173, 158, 160; 725/32, 39, 37, 725/43, 52, 61, 93
See application file for complete search history.

(56) References Cited

U.S. PATENT DOCUMENTS

| | | | | |
|---|---|---|---|---|
| 2009/0089834 A1* | 4/2009 | Parker | | H04N 5/44543 725/39 |
| 2010/0259490 A1* | 10/2010 | Lee | | G06F 3/0414 345/173 |
| 2010/0333133 A1* | 12/2010 | Krakirian | | H04N 7/17318 725/32 |
| 2011/0181539 A1* | 7/2011 | Aono | | G06F 3/0414 345/173 |
| 2014/0123081 A1* | 5/2014 | Park | | G06F 21/36 715/863 |
| 2014/0152581 A1* | 6/2014 | Case | | G06F 3/041 345/173 |
| 2014/0168523 A1* | 6/2014 | Kwak | | H04N 5/4403 348/734 |
| 2014/0340323 A1* | 11/2014 | Jang | | G06F 3/0416 345/173 |

(Continued)

FOREIGN PATENT DOCUMENTS

JP 2001-320786 A 11/2001
KR 10-2010-0136618 A 12/2010

*Primary Examiner* — Jefferey F Harold
*Assistant Examiner* — Mustafizur Rahman

(57) ABSTRACT

An image processing terminal comprises a processor, a memory and a communication unit receives a control signal from a remote controller in response to a selection of a key by a user. One or more programs stored in the memory include instructions for determining whether a sensing level of the key in the received control signal corresponds to a normal press or a force press and executing a control command corresponding to the normal press or the force press. In response to a force press being inputted to the remote controller, the processor performs at least one of change of an object displayed on a screen or a scene transition of contents. An operation of the image processing terminal when a normal press is inputted to the remote controller is different from an operation of the image processing terminal when the force press is inputted to the remote controller.

21 Claims, 17 Drawing Sheets

(56) References Cited

U.S. PATENT DOCUMENTS

2015/0212591 A1* 7/2015 Strom .................. G06F 3/0202
   345/169
2015/0296062 A1* 10/2015 Lee .................. G02F 1/133345
   455/566

* cited by examiner

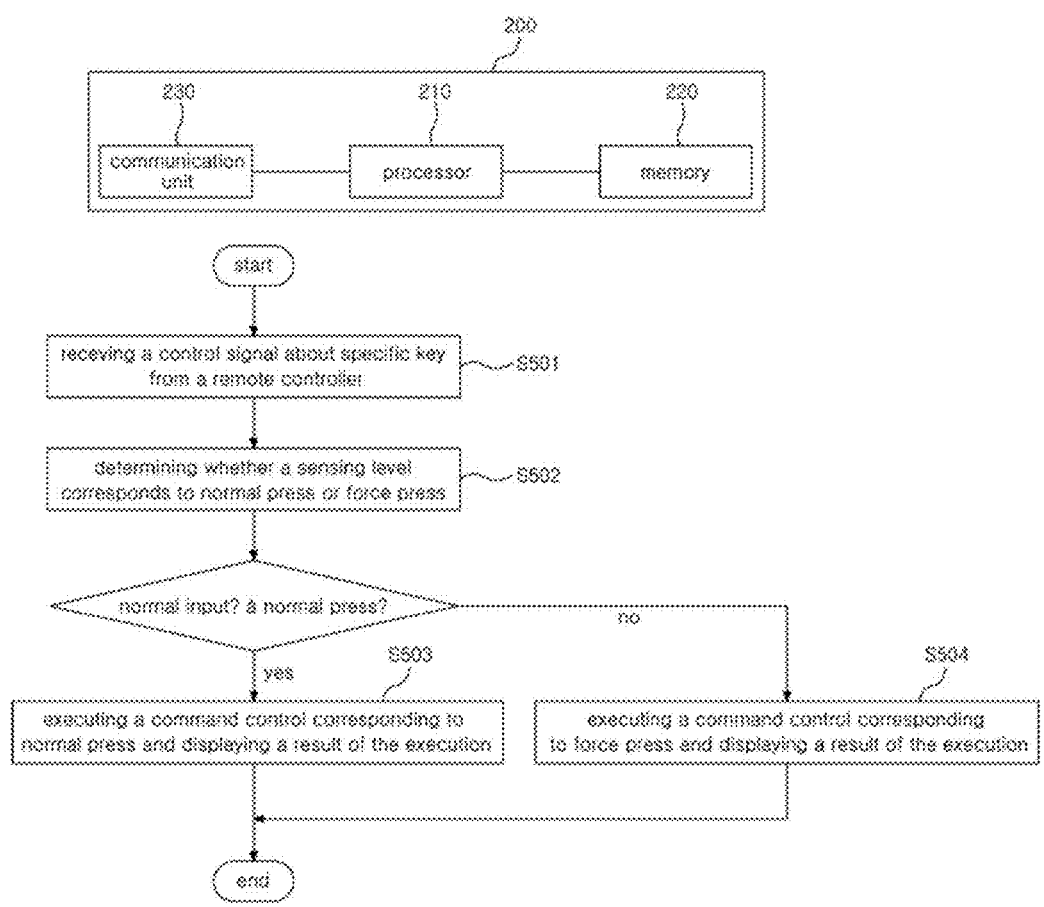

FIG. 9
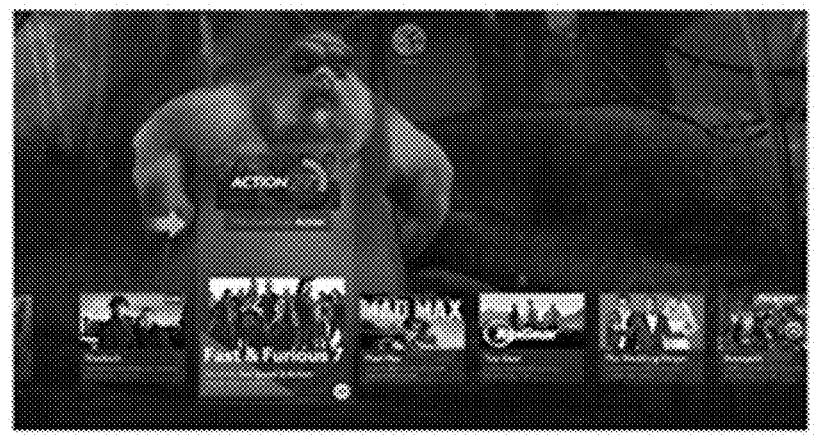
Displaying a function setting list about playing of a VOD | Normal input about a function key
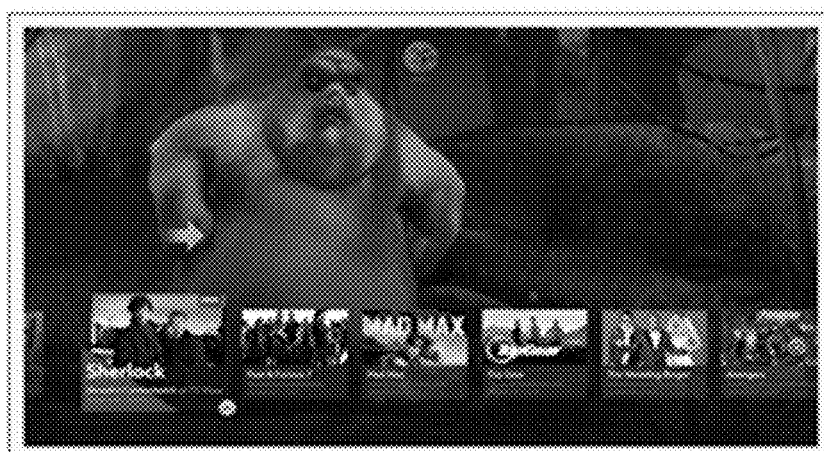
Displaying other movie of an actor appeared in a selected VOD | force input about a function key
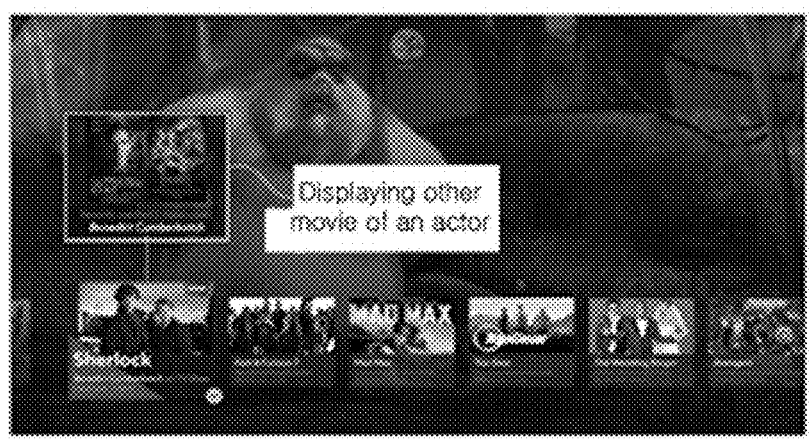

FIG. 11
Normal input about a home key | Displaying an environment setting of a TV or selectable application
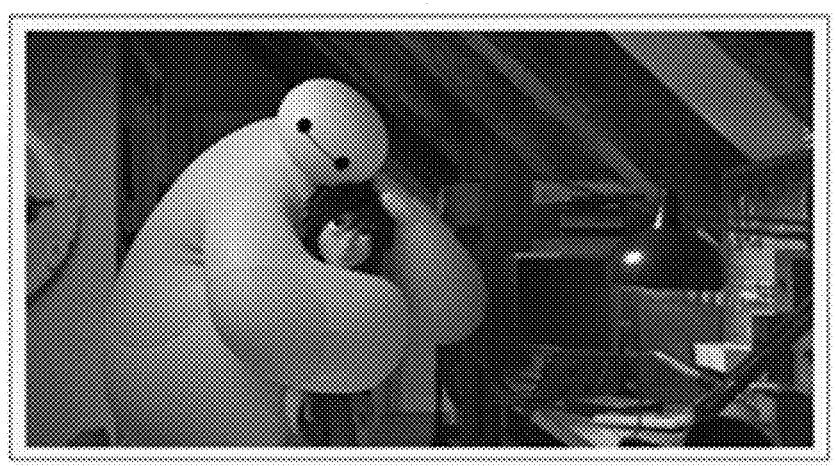
Force input about a home key | Displaying an VOD viewed in recent
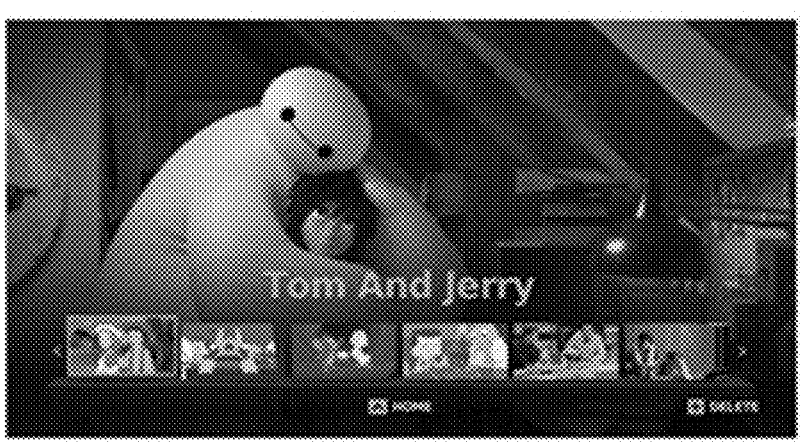

IMAGE PROCESSING TERMINAL AND METHOD FOR PROVIDING A SERVICE BASED ON SENSING LEVELS OF A KEY IN A REMOTE CONTROLLER

PRIORITY

This application claims priority under 35 U.S.C. §119(a) to a Korean patent application filed on Mar. 23, 2016 in the Korean Intellectual Property Office and assigned Serial No. 10-2016-0034577, the entire disclosure of which is incorporated herein by reference.

BACKGROUND

1. Field of the Invention

The present disclosure relates to an image processing terminal and a method for providing a service based on sensing levels of a key in a remote controller. More particularly, the present invention provides the image processing terminal performing various operations in response to pressure applied to the key in the remote controller controlling the image processing terminal.

2. Description of the Related Art

A set-top box is connected to a television, converts properly a video signal and a voice signal received from an external device and displays an image corresponding to the converted video and voice signal through the television.

The set-top box receives an IPTV signal, a cable TV signal, a satellite TV signal or a general signal for broadcasting, and the set-top box displays the received signal on the television.

The set-top box generally interoperates with a wired or wireless controller. A user remotely controls the set-top box with the remote controller.

Functions of the set-top box or the television are diversified as types of contents and services provided from an IPTV, a cable TV or a satellite TV have been diversified. The number of buttons or keys in the remote controller controlling the set-top box or the television has increased due to the diversification of the functions.

It is preferable to provide various contents and services to the user, but the user need to know a function of each button in the remote controller in order to fully enjoy the various contents and services provided.

It becomes difficult for the user to control the remote controller with keeping the user's eyes toward the television (blind control) because the remote controller has lots of buttons or keys. Additionally, there are many factors distracting user's view when the user controls the remote controller. For example, the user should look at the remote controller and select a relevant button whenever the user wants to properly control the remote controller.

A demand for a remote controller having few or no button has been on the rise. Since a conventional remote controller does not satisfy such demand, a system and method for controlling the remote controller having few or no button is needed while allowing the user to enjoy a variety of contents and services. With the remote controller having few or no button, the user may easily figure out how to use the remote controller and it also enables the user to perform the blind control when using the remote controller.

SUMMARY

The invention has been made to address at least the disadvantages and problems described above, and to provide at least the advantages described below. An aspect of the invention provides an image processing terminal that can receive a control signal from a remote controller and perform various operations on the image processing terminal.

According to one embodiment of the invention, an image processing terminal comprises: a processor; a memory connected to the processor; and a communication unit configured to receive a control signal from a remote controller in response to a selection of a key by a user. Here, one or more programs are stored in the memory and configured to be executed by the processor. The programs includes an instruction for determining whether a sensing level of the key in the received control signal corresponds to a normal press or a force press and executing a control command corresponding to the normal press or the force press. In response to a force press being inputted to the remote controller, the processor performs at least one of change of an object displayed on a screen or a scene transition of contents. An operation of the image processing terminal when a normal press is inputted to the remote controller is different from an operation of the image processing terminal when the force press is inputted to the remote controller. An input corresponding to the sensing level includes the normal press and the force press. The force press is an input corresponding to a coordinate value that exceeds a scope of a coordinate value or the coordinate value corresponding to a sensing level of the normal press as further pressure is applied to the key while pressing or touching the key still remains after the normal press.

According to another embodiment of the invention, an image processing terminal comprises: a processor; a memory connected to the processor; and a communication unit configured to receive a control signal from a remote controller in response to a selection of a key by a user. Here, one or programs are stored in the memory and configured to be executed by the processor. The programs including instructions for determining a sensing level of the key in the received control signal corresponds to a normal press or a force press and executing a control command corresponding to the normal press or the force press. In response to the force input or the force press being inputted to the remote controller, the processor gradually magnifies a specific object displayed on a screen so that a change of Graphic User Interface (GUI) is shown and performs a preview or a play of contents related to the object. An operation of the image processing terminal when a normal press is inputted to the remote controller is different from an operation of the image processing terminal when the force press is inputted to the remote controller. An input corresponding to the sensing level includes the normal press and the force input or the force press. The force input and the force press mean an input pressing or touching a key with higher pressure or wider area than the normal press, and a sensing level corresponding to the force input is different from a sensing level corresponding to the force press.

According to still another embodiment of the invention, an image processing terminal comprises: a processor; a memory connected to the processor; and a communication unit configured to receive a control signal from a remote controller in response to a selection of a key by a user. Here, one or more programs are stored in the memory and configured to be executed by the processor. The programs including instructions for executing a control command according to a control signal of the key received from the remote controller. In response to a force press being inputted to the remote controller, the processor executes at least one of change of an object displayed on a screen or a scene transition of contents. The remote controller includes two or more of a navigation key, a determination key and a function key, an operation executed by the processor when a force press is inputted to one of the keys is different from an operation executed by the processor when the force press is inputted to another key other than the keys. The force press is an input of pressing or touching a key with higher pressure or wider area than a normal press.

According to still another embodiment of the invention, an image processing terminal comprises: a processor; a memory connected to the processor; and a communication unit configured to receive a control signal from a remote controller in response to a selection of a key by a user. Here, one or more programs are stored in the memory and configured to be executed by the processor. The programs include instructions for playing a content at which a cursor locates among plural contents displayed on a screen in Picture In Picture (PIP) on a specific area of the screen when a sensing level of the key is determined to be a force press from the control signal received from the remote controller. An input corresponding to the sensing level of the key includes a normal press and the force press. The force press is an input corresponding to a coordinate value that exceeds a scope of a coordinate value or the coordinate value corresponding to a sensing level of the normal press as further pressure is applied to the key while pressing the key still remains after the normal press.

According to still another embodiment of the invention, an image processing terminal comprises: a processor; a memory connected to the processor; and a communication unit configured to receive a control signal from a remote controller in response to a selection of a key by a user. Here, one or more programs are stored in the memory and configured to be executed by the processor. The programs include instructions for increasing a size of contents at which a cursor locates among plural contents displayed on a screen when a sensing level is determined to be force input from a first control signal of the key received from the remote controller. The programs further include instructions for playing the contents in PIP on a specific area of the screen while the size of the contents remain being increased when a sensing level of the key is determined to be a force press based on a second control signal received from the remote controller. An input corresponding to the sensing level of the key includes a normal press, the force input and the force press. The force input is an input corresponding to a coordinate value that exceeds a scope of a coordinate value or the coordinate value corresponding to a sensing level of the normal press as further pressure is applied to the key while pressing or touching the key still remains after the normal press. The force press is an input corresponding to a coordinate value that exceeds a scope of a coordinate value or the coordinate value corresponding to a sensing level of the force input as further pressure is applied to the key while pressing or touching the key still remains after the force input.

According to still another embodiment of the invention, an image processing terminal comprises: a processor; a memory connected to the processor; and a communication unit configured to receive a control signal from a remote controller in response to a selection of a key by a user. Here, one or more program are stored in the memory and configured to be executed by the processor. The programs include instructions for increasing a size of contents at which a cursor locates among plural contents displayed on a screen when a sensing level is determined to be a first input from a first control signal of the key received from the remote controller. The programs also include instructions for displaying an executable operation above, under, on a right side or on a left side around the contents whose size is increased. The programs further include instructions for executing a control command corresponding to the control signal of a gesture input when a second control signal received from the remote controller is determined to be the gesture input that sequentially touches plural keys of the remote controller in a specific direction while the size of the contents remains increased. An input corresponding to the sensing level of the key includes a normal press, the force input and a force press. The force input is an input corresponding to a coordinate value that exceeds a or the coordinate value of a coordinate value corresponding to a sensing level of the normal press as further pressure is applied to the key while pressing or touching the key still remains after the normal press. The force press is an input corresponding to a coordinate value that exceeds a scope of a coordinate value or the coordinate value corresponding to a sensing level of the force input as further pressure is applied to the key while pressing or touching the key still remains after the force input.

According to still another embodiment of the invention, an image processing terminal comprises: a processor; a memory connected to the processor; and a communication unit configured to receive a control signal from a remote controller in response to a selection of a key by a user. Here, one or more programs are stored in the memory and configured to be executed by the processor. The programs include instructions for reducing a size of contents being played on a screen and displaying the contents whose size is reduced when a sensing level of the key is determined to be a force input from a first control signal received from the remote controller. The programs further include instructions for playing the contents whose size is reduced in Picture In Picture (PIP) on a specific area of the screen when a sensing level of the key is determined to be a force press from a second control signal received from the remote controller. An input corresponding to the sensing level of the key includes a normal press, the force input and the force press. The force input is an input corresponding to a coordinate value that exceeds a scope of a coordinate value or the coordinate value corresponding to a sensing level of the normal press as further pressure is applied to the key while pressing or touching the key still remains after the normal press. The force press is an input corresponding to a coordinate value that exceeds a scope of a coordinate value or the coordinate value corresponding to a sensing level of the force input as further pressure is applied to the key while pressing or touching the key still remains after the force input.

According to still another embodiment of the invention, an image processing terminal comprises: a processor; a memory connected to the processor; and a communication unit configured to receive a control signal from a remote controller in response to a selection of a key by a user. Here, one or more programs are stored in the memory and configured to be executed by the processor. The programs include instructions for reducing a size of a task displayed on a screen in the event that a sensing level of a specific key is determined to be a force input from a first control signal received from the remote controller. The programs further include instructions for displaying a user interface for converting the task to another task while the size of the task remains reduced in the event that the sensing level of the specific key is determined to be a force press from a second control signal received from the remote controller. An input corresponding to the sensing level of the key includes a normal press, the force input and the force press. The force input is an input corresponding to a coordinate value that exceeds a scope of a coordinate value or the coordinate value corresponding to a sensing level of the normal press as further pressure is applied to the key while pressing or touching the key still remains after the normal press. The force press is an input corresponding to a coordinate value that exceeds a scope of a coordinate value or the coordinate value corresponding to a sensing level of the force input as further pressure is applied to corresponding key while pressing or touching the key still remains after the force input.

According to still another embodiment of the invention, an image processing terminal comprises: a processor; a memory connected to the processor; and a communication unit configured to receive a control signal from a remote controller in response to a selection of a key by a user. Here, one or more program are stored in the memory and configured to be executed by the processor. The programs include instructions for displaying a scene transition screen showing a process until before a specific application is executed on a screen on which plural applications are displayed in the event that a sensing level of a specific key is determined to be a force input from a first control signal received from the remote controller, while a cursor locates at the specific application among the plural applications displayed on the screen. The programs further include instructions for displaying an execution result of the specific application on the screen when the sensing level of the specific key is determined to be a force input from a second control signal received from the remote controller. An input corresponding to the sensing level of the key includes a normal press, the force input and the force press. The force input is an input corresponding to a coordinate value that exceeds a scope of a coordinate value or the coordinate value corresponding to a sensing level of the normal press as further pressure is applied to the key while pressing or touching the key still remains after the normal press. The force press is an input corresponding to a coordinate value that exceeds a scope of a coordinate value or the coordinate value corresponding to a sensing level of the force input as further pressure is applied to corresponding key while pressing or touching the key still remains after the force input.

According to one embodiment of the invention, a method for providing contents or services through an image processing terminal, the method comprising: receiving a control signal including a sensing level of a key from a remote controller; determining whether the sensing level of the key corresponds to a normal press or a force press; and executing a control command corresponding to the normal press or the force press. Here, at least one of change of an object displayed on a screen and a scene transition of content is executed in response to the control command when a force press is inputted to the remote controller. An operation of the image processing terminal when a normal press is inputted to the remote controller is different from an operation of the image processing terminal when the force press is inputted to the remote controller. An input corresponding to the sensing level includes the normal press and the force press. The force press is an input corresponding to a coordinate value that exceeds a scope of a coordinate value or the coordinate value corresponding to a sensing level of the normal press as further pressure is applied to corresponding key while pressing or touching the key still remains after the normal press.

In one embodiment, the invention may minimize a number of buttons or keys in a remote controller to enjoy various contents services.

Additionally, users may figure out easily usage of the remote controller.

Furthermore, the users can do the blind control when using the remote controller so that controlling the remote controller does not hinder usage of the contents services.

BRIEF DESCRIPTION OF DRAWINGS

The aspects, features, advantages and embodiments of the invention will be more apparent from the following detailed description taken in conjunction with reference to the accompanying drawings, in which:

FIG. 5 is a view illustrating an image processing terminal according to one embodiment of the invention;

FIG. 9 is a view illustrating a screen of the image processing terminal according to still another embodiment of the invention;

FIG. 11 is a view illustrating a screen of the image processing terminal according to still another embodiment of the invention;

DETAILED DESCRIPTION

In the present specification, an expression used in the singular encompasses the expression of the plural, unless it has a clearly different meaning in the context.

In the present specification, terms such as "comprising" or "including," etc., should not be interpreted as meaning that all of the elements or operations are necessarily included. That is, some of the elements or operations may not be included, while other additional elements or operations may be further included.

Also, terms such as "unit," "module," etc., as used in the present specification may refer to a part for processing at least one function or action and may be implemented as hardware, software, or a combination of hardware and software.

Hereinafter, embodiments of the invention will be described in detail with reference to accompanying drawings.

Figure 1:
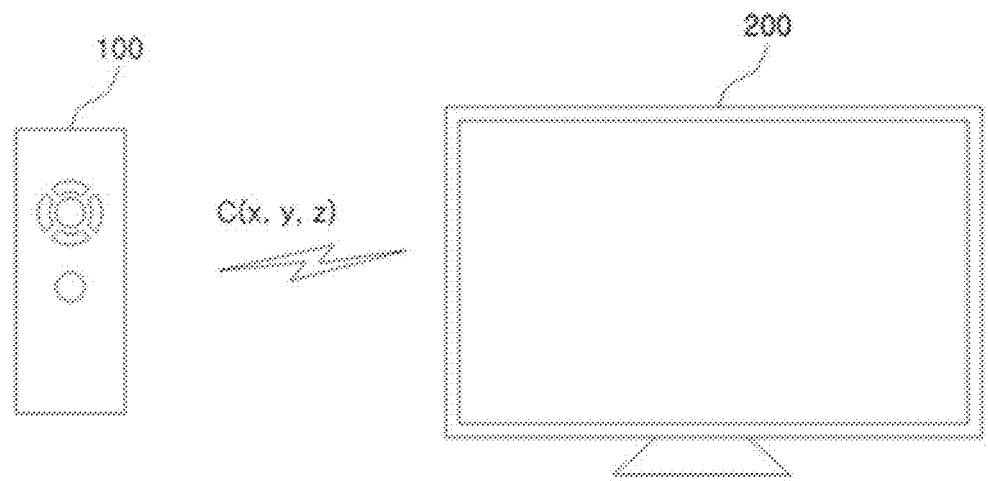
FIG. 1 is a view illustrating a media system according to one embodiment of the invention.

FIG. 1 is a view illustrating a media system according to one embodiment of the invention.

The media system of the present embodiment includes a remote controller 100 and an image processing terminal 200.

Here, the remote controller 100 includes at least one key for controlling the image processing terminal 200 (including hardware control and software control), and transmits a control signal in response to a sensing level of a key to the image processing terminal 200.

In this case, the image processing terminal 200 may perform different operations according to the sensing levels of the key selected by a user.

Here, the sensing level of the key corresponds to pressure applied (touched) to the key of the remote controller 100 by the user. If the key of the remote controller 100 is matched with three dimensional coordinate (x, y, z), the sensing level may be expressed with a coordinate (z) in a direction vertical to a plane of the key.

The sensing level may depend on the area of the key pressed (touched) with the pressure, and correspond to a coordinate (x, y).

Accordingly, both the coordinate of the selected key and the sensing level may be expressed in a three-dimensional coordinate (x, y, z).

However, other methods may be used to express the coordinate and the sensing level of the selected key.

Hereinafter, it is assumed that the sensing level is determined by using the coordinate (z) of the three dimensional coordinate, i.e. the pressure applied to the key by the user.

The remote controller 100 may transmit a control signal (hereinafter, referred to as "C(x, y, z)") including a coordinate (x, y, z) of corresponding key to the image processing terminal 200, when the user selects a key with a specific sensing level.

If a value of the coordinate (z) of the selected key by the user (i.e. pressure applied to the key by the user) is less than a predetermined reference value, the image processing terminal 200 may determine an input corresponding to the value as a normal press. If the value of the coordinate (z) of the selected key by the user is more than the predetermined reference value, the image processing terminal 200 may determine an input corresponding to the value as a force press for selecting the key with further pressure or area.

Accordingly, the image processing terminal 200 may perform different operations according to the pressure applied to the same key by the user.

In one embodiment, a middle input (hereinafter, referred to as "force input") between the normal press and the force press may exist according to the coordinate (z) of the key selected by the user. The image processing terminal 200 may perform an operation corresponding to the force input.

Here, the force input is an input that exceeds a value of a coordinate (z) corresponding to the sensing level of the normal press as further pressure is applied to the key while the pressing or a touching to the key still remains after the normal press. The force press is an input that exceeds the value of a coordinate (z) corresponding to the sensing level of the force input as further pressure is applied to the key while the pressing or a touching to the key still remains after the force input.

Hereinafter, the keys of the remote controller 100 and the sensing level will be described in detail.

The key of the remote controller 100 may be implemented by hardware including dome key type, or implemented by software.

The image processing terminal 200 may be a display device such as a television (TV) for displaying an image or a device such as a set-top box for transmitting an image signal to the display device.

That is, the image processing terminal 200 is not limited as a specific device as long as it processes the image. The image processing terminal 200 may be the set-top box or a television having a function of the set-top box.

The image processing terminal 200 may receive the control signal C(x, y, z) about the key selected by the user from the remote controller 100, and determine the types of inputs from the received control signal.

In the event that the sensing level is determined to be the force input, the image processing terminal 200 may perform a Graphic User Interface (GUI) effect for an object or a task at which a cursor locates among plural objects displayed on a screen.

In the event that the sensing level is determined to be the force press, the image processing terminal 200 may perform a different operation of the key according to a type of tasks displayed on the present screen, an identifier of the key and a control command corresponding to the identifier of the key. The different operation may be a change of an object displayed on the screen or a scene transition of contents.

Here, the object may include a user interface such as a menu, a button and an icon of an executable application, etc. and contents such as an image, a moving picture and so on. The change of the object may include at least one of a change of the type of the object, the size of the object, the number of the object, or a change of arrangement displayed on the screen according to the size or the number.

The scene transition of the contents may include a transition of the screen in whole or in part into another screen according to a display of detailed information about the contents, a preview of contents selected or contents recently used.

Hereinafter, the operation of the image processing terminal 200 according to the sensing level corresponding to the control signal received from the remote controller 100 will be described in detail.

Figure 2:
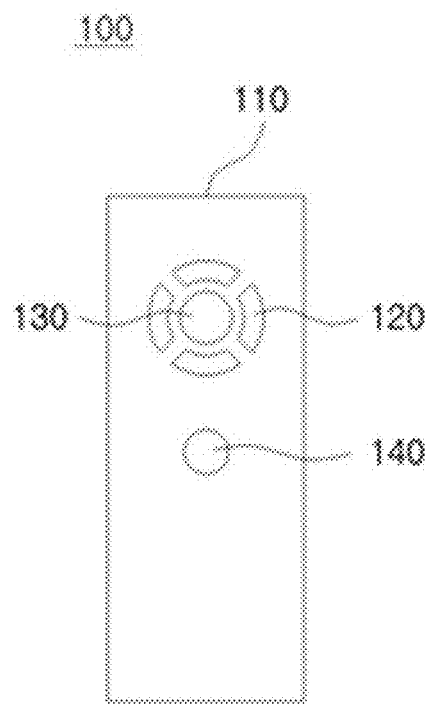
FIG. 2 is a view illustrating a remote controller according to one embodiment of the invention.

FIG. 2 is a view illustrating a remote controller according to one embodiment of the invention.

The remote controller 100 may comprise a body 110, a navigation key 120 including up, down, left, or right directional keys, a function key 130 for performing a variety of operations such as an esc key and a home key, and a determination key 140 for performing an operation such as an OK key.

On the other hand, various keys may exist in the remote controller 100, but these keys may be classified as the navigation key 120, the function key 130 and the determination key 140.

The remote controller 100 may be connected to the image processing terminal 200 via wireless communication, and control the operations of the image processing terminal 200.

For example, the remote controller 100 may control a program guide (EPG) displayed on the image processing terminal 200 (e.g., the television).

In one embodiment, a function related to two or more operations of the image processing terminal 200 may be set to at least one of the keys in the remote controller 100.

Particularly, the remote controller 100 may transmit a control signal to the image processing terminal 200. The control signal for performing different operations may be generated according to pressure or an area applied to the key by a touch means such as a finger and any input device.

Here, the remote controller 100 may transmit the control signal C(x, y, z) to the image processing terminal 200. The control signal includes the three dimensional coordinate in accordance with the pressure applied to the key by the user.

For example, when the user presses the navigation key 120 corresponding to a right directional key with a normal press, the remote controller 100 may transmit a control signal C1 having a coordinate (x, y, z1) corresponding to the normal press to the image processing terminal 200.

In the event that further pressure is applied to the key while pressing or touching to the key still remains after the normal press, the remote controller 100 may transmit a control signal C2 having a coordinate (x, y, z2) corresponding to a force input to the image processing terminal 200.

In the event that further pressure is applied to the key while pressing or touching to the key still remains after the force input, the remote controller 100 may transmit a control signal C3 having a coordinate (x, y, z3) corresponding to a force press to the image processing terminal 200.

On the other hand, the force press may be activated when the force input is inputted to the remote controller 100.

Subsequently, the image processing terminal 200 may perform different operations according to the control signal C1, C2 or C3 received from the remote controller 100.

For example, the image processing terminal 200 may perform an operation of displaying a program guide in response to the first control signal C1 corresponding to the normal press, and gradually magnify a size of a program at which a cursor locates in response to the second control signal C2 corresponding to the force input. The image processing terminal 200 may play back the program whose size is magnified in Picture In Picture (PIP) on a certain area of a screen in response to the third control signal C3 corresponding to the force press.

That is, the image processing terminal 200 may perform different operations corresponding to the normal press, the force input or the force press in response to the sensing level that is determined based on the pressure applied to the same key of the remote controller 100 by the user.

Here, the image processing terminal 200 may perform an operation of displaying the program guide if it is the television, and may perform an operation of transmitting an image signal related to the program guide to the television if it is the set-top box.

The remote controller 100 may transmit a control signal including direct command requesting to operate a specific function to the image processing terminal 200. However, the remote controller 100 may also transmit the control signal including the three dimensional coordinate (x, y, z) corresponding to the key selected by the user to the image processing terminal 200.

In this time, an operation related to the three dimensional coordinate (x, y, z) may be determined by the image processing terminal 200.

Accordingly, though the remote controller 100 transmits the same three dimensional coordinate about the same key to the image processing terminal 200, the image processing terminal 200 may perform different operations according to software installed therein.

A user's gesture, sequentially touching keys with sliding in a specific direction, may be inputted to the remote controller 100. The remote controller 100 may transmit a control signal including information concerning the gesture to the image processing terminal 200.

The image processing terminal 200, receiving the control signal including the information concerning the gesture from the remote controller 100, may perform an operation corresponding to the received control signal.

Hereinafter, the sensing level in light of embodiments of the invention will be described in detail with reference to accompanying drawings FIG. 3A, FIG. 3B, FIG. 4A and FIG. 4B.

Figure 3A:
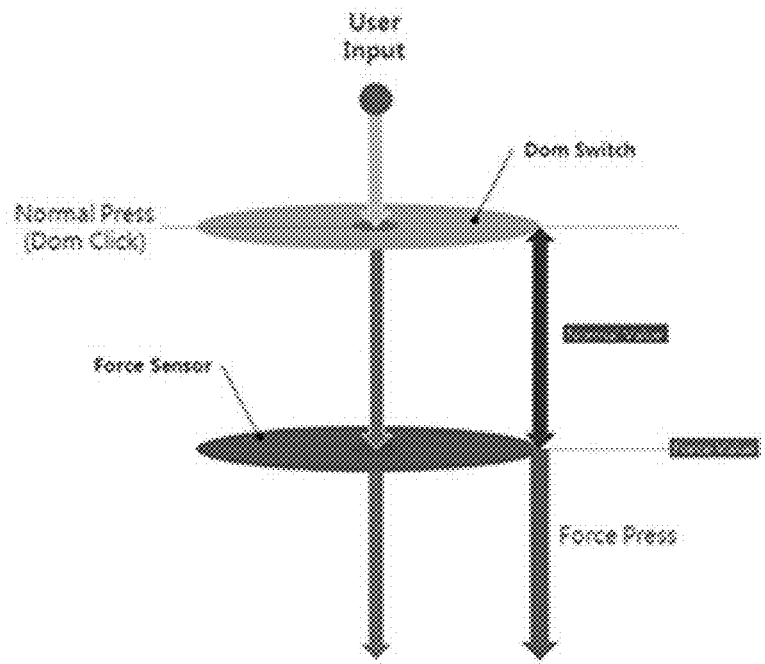
FIG. 3A is a view illustrating a sensing level according to one embodiment of the invention.
Figure 3B:
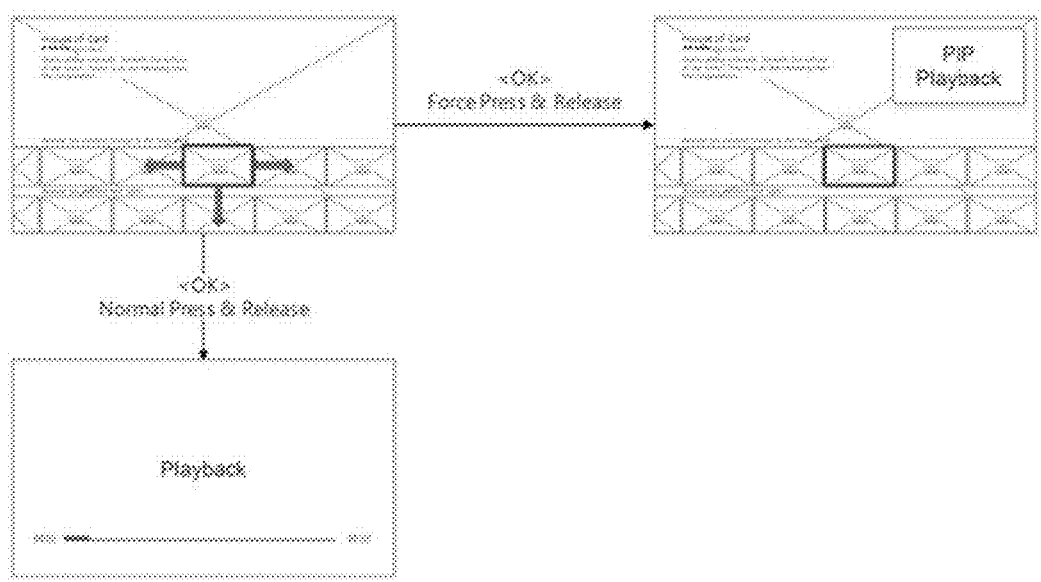
FIG. 3B is a view illustrating an operation of an image processing terminal according to the sensing level in FIG. 3A.

FIG. 3A is a view illustrating a sensing level according to one embodiment of the invention, and FIG. 3B is a view illustrating an operation of an image processing terminal according to the sensing level in FIG. 3A.

An input corresponding to the sensing level of the present embodiment may include a normal press and a force press as shown in FIG. 3A.

The normal press means the same input as an input in conventional remote controller, and the force press refers to an input when further pressure is applied to a key while pressing or touching to the key still remains after the normal press.

That is, if further pressure is not applied to the coordinate (z) of a key while the user applies the normal press to the key for a long time (long press), the long press may be determined to be the normal press, not the force press.

The force press means an input when the sensing level that exceeds a scope of a value of a coordinate (z) or the value of a coordinate (z) corresponding to the normal press as further pressure is applied to the key while the pressing or touching to the key still remains after the normal press.

For example, as shown in FIG. 3A and FIG. 3B, in the event that the user applies the normal press to an OK key of the remote controller 100 while a cursor locates at specific contents, the specific contents may be played back on a whole area of a screen.

On the other hand, in the event that the user applies the force press to the OK key of the remote controller 100 while the cursor locates at the specific contents, the contents may be played back in picture in picture (PIP) on a certain area of the screen.

Further, the force press may be classified as a force up and a force down.

In one embodiment, the force press may be determined as the force up when the force press is applied to an up direction key in the navigation key 120 depicted in FIG. 2. In addition, the force press may be determined as the force down when the force press is applied to a down directional key in the navigation key 120 depicted in FIG. 2.

For example, a recommendation program may be displayed when the force press is applied to the up directional key while a home screen is being displayed. A video on demand (VOD) list may be displayed when the force press is applied to the down directional key while the home screen is being displayed.

In this case, the recommendation program is displayed when the force press is applied to the up directional key while the home screen is being displayed, and then a screen on which the recommendation program is displayed is returned to the home screen when the force press is applied to the down directional key. Next, the VOD list is displayed when the force press is applied to the down directional key while the home screen is being displayed.

In another embodiment, the force press may be determined as the force up when the sensing level becomes a first sensing level as the force press is applied to a specific key. The force press may be determined as the force down when the sensing level becomes a second sensing level as the force press is applied to the specific key.

That is, the input may be divided into the normal press and the force press according to the pressure applied to the key by the user. The force press may be subdivided into a plurality of sensing levels.

Hereinafter, it is assumed that the force press is subdivided to a first sensing level and a second sensing level, for convenience for description.

For example, a recommendation program may be displayed when corresponding sensing level becomes the first sensing level as the force press is applied to the determination key 140 while a home screen is being displayed. A VOD list may be displayed when the sensing level becomes the second sensing level as the force press is applied to the determination key 140.

In this case, the recommendation program may be displayed when the sensing level becomes the first sensing level as the force press is applied to the determination key 140 while the home screen is being displayed. Subsequently, a screen on which the recommendation program is displayed may be returned to the home screen when the sensing level becomes the second sensing level as the force press is applied to the determination key 140.

Subsequently, the VOD list may be displayed in the event that the second sensing level is continuously kept as the force press is applied to the determination key 140 while the home screen is being displayed. Next, a screen on which the VOD list is displayed may be returned to the home screen when the sensing level is changed to the first sensing level.

In brief, the remote controller 100 of the present embodiment determines the sensing level based on the pressure or the area applied to the key by the user and transmits the control signal including the information concerning the determined sensing level to the image processing terminal 200. The image processing terminal 200 may perform a different operation according to the sensing level, included in the received control signal, of the same key.

On the other hand, the coordinate of the key is expressed in the three dimensional coordinate (x, y, z), but it may be expressed as a four dimensional coordinate (x, y, z, t) in consideration of a time pressed to the key. That is, one or more parameters related to the sensing level may exist.

If the remote controller 100 of the invention is compared with a conventional remote controller, the conventional remote controller includes normal press only, and only one function may be matched with one key.

Accordingly, a number of keys increases whenever a function is added in the conventional remote controller. As a result, the structure of the conventional remote controller have become complicated and caused inconvenience to users.

Whereas, there may be the normal press and the force press to one key according to the sensing level in the remote controller 100. The force press may be subdivided into a plurality of sensing levels, and thus a plurality of functions may be matched with one key.

Accordingly, since a number of keys in the remote controller 100 is minimized, the remote controller 100 may have simple structure and it is convenient for the user to use the remote controller 100.

Figure 4A:
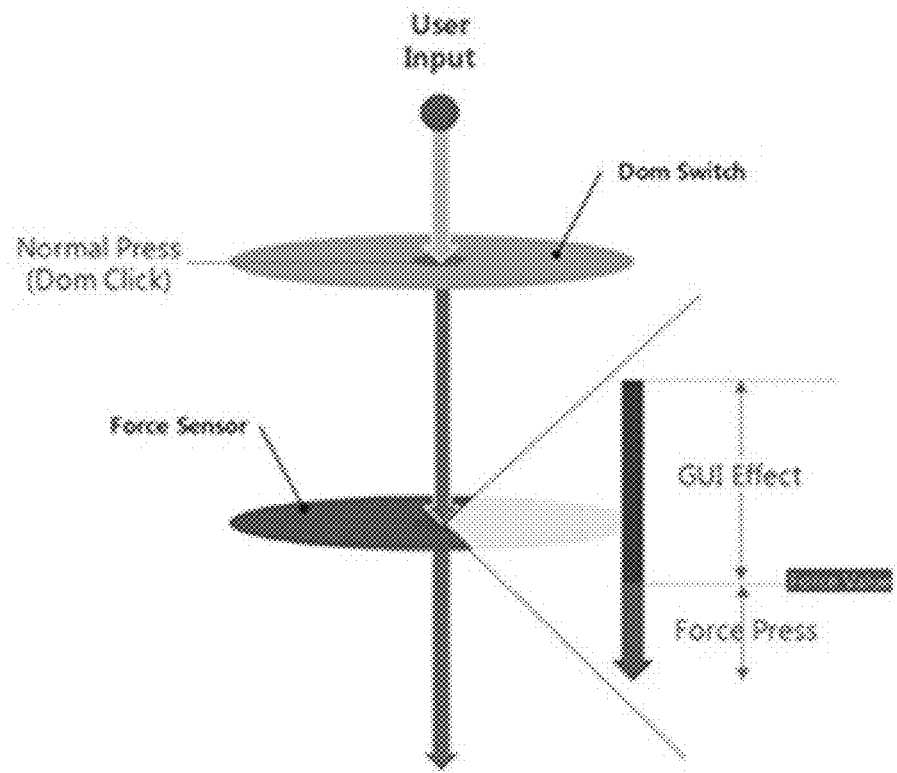
FIG. 4A is a view illustrating a sensing level according to another embodiment of the invention.
Figure 4B:
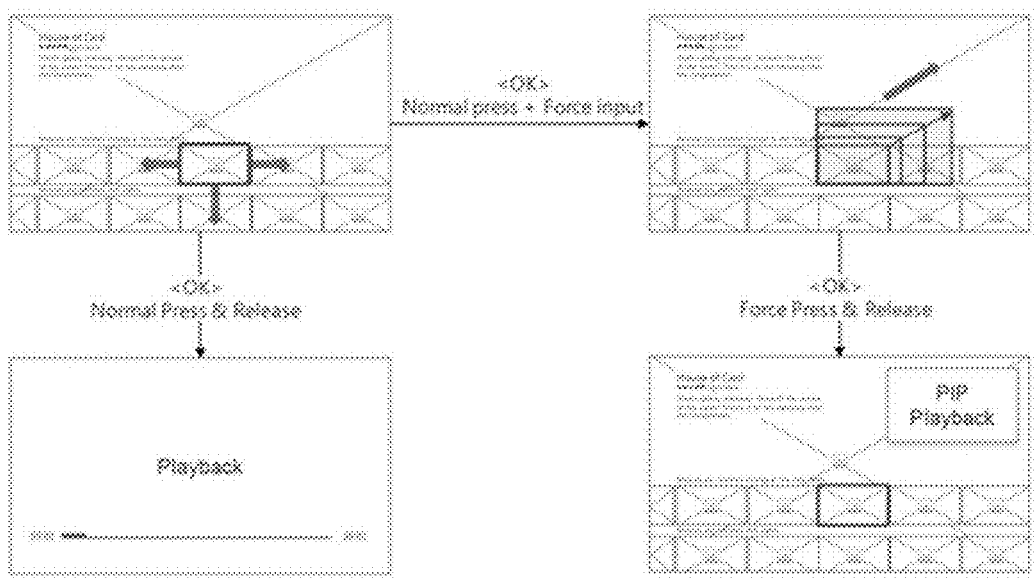
FIG. 4B is a view illustrating an operation of an image processing terminal according to the sensing level in FIG. 4A.

FIG. 4A is a view illustrating a sensing level according to another embodiment of the invention, and FIG. 4B is a view illustrating an operation of an image processing terminal according to the sensing level in FIG. 4A.

An input corresponding to the sensing level of the present embodiment may include a normal press, a force input and a force press.

As shown in FIG. 4A, the normal press may be the same input in the conventional remote controller. The force input refers to an input that exceeds a scope of a value of a coordinate (z) or the value of a coordinate (z) corresponding to the sensing level of the normal press as further pressure is applied to the key while the pressing or the touching to the key remains after the normal press.

Furthermore, the force press means an input that exceeds a scope of a value of a coordinate (z) or the value of a coordinate (z) corresponding to the sensing level of the force input as further pressure is applied to the key while the pressing or the touching to the key remains after the force input.

For example, as shown in FIG. 4B, when the normal press is applied to the OK key of the remote controller 100 while a cursor locates at specific contents among plural contents, the contents may be played back on a whole area of a screen.

When the force input is applied to the OK key of the remote controller 100 while the cursor locates at the specific contents, the contents may be displayed with GUI effect on the screen until before the contents is played back in PIP on a certain area of the screen as a result of the force press shown in FIG. 3B.

That is, if the input corresponding to the sensing level is divided into the normal press and the force press, the contents at which the cursor locates may be directly displayed in PIP on the certain area of the screen when the force press is applied to the OK key.

Whereas, when the force press is applied via the force input after the normal press, the contents at which the cursor locate are not directly displayed in PIP. Instead, the content at which the cursor locates among plural contents may be displayed with the GUI effect such as gradual magnification of a size of the content. The GUI effect includes a slow operation and the contents are finally played back in PIP on the certain area of the screen, as shown in FIG. 4B.

The result of the force input may be a middle operation related to the result of the force press as described in FIG. 4B or be independent operation irrespective of the result of the force press.

FIG. 5 is a view illustrating an image processing terminal according to one embodiment of the invention.

The image processing terminal 200 of the present embodiment includes a processor 210, a memory 220 connected to the processor 210 and a communication unit 230 communicating with the remote controller 100.

One or more programs are stored in the memory 220 and configured to be executed by the processor 210. The programs include instructions (commands) for operations described below.

Hereinafter, an operation of the image processing terminal 200 including the above elements will be described in detail. The input corresponding to the sensing level may be divided into the normal press and the force press.

In a step of S501, the image processing terminal 200 receives a control signal about a specific key from the remote controller 100.

In a step of S502, the image processing terminal 200 determines whether it corresponds to the normal press or the force press by verifying the sensing level of the key from the received control signal is less or more than a predetermined reference value.

In a step of S503, if it is determined that the sensing level corresponds to the normal press, the image processing terminal 200 executes a control command corresponding to the normal press of the key according to types of tasks displayed on a screen or an identifier of the key. The image processing terminal 200 displays a result of the executed control command on the screen.

In a step of S504, if it is determined that the sensing level corresponds to the force press, the image processing terminal 200 executes a control command corresponding to the force press of the key according to types of tasks displayed on a screen or the identifier of the key. The image processing terminal 200 displays a result of the executed control command on the screen.

The force press may be subdivided depending on the pressure applied to the key. The image processing terminal 200 may execute a control command corresponding to the pressure and display a result of the executed control command on the screen.

In addition to the pressure applied to the key, a time (touch time) for being applied to the key may be considered.

Accordingly, an operation of the image processing terminal 200 in response to a specific key of the remote controller 100 may be determined according to the normal press or the force press. Further, the force press may be determined according to the pressure applied to the key by the user. The operation of the image processing terminal 200 may be determined considering the time during which the key is touched or pressed.

In the event that the force input is used apart from the normal press and the force press in the sensing level, the image processing terminal 200 may further determine if it is the force input in the step of S502.

As a result, plural functions may be matched with one key, and thus the number of the key in the remote controller 100 may be minimized.

Figure 6:
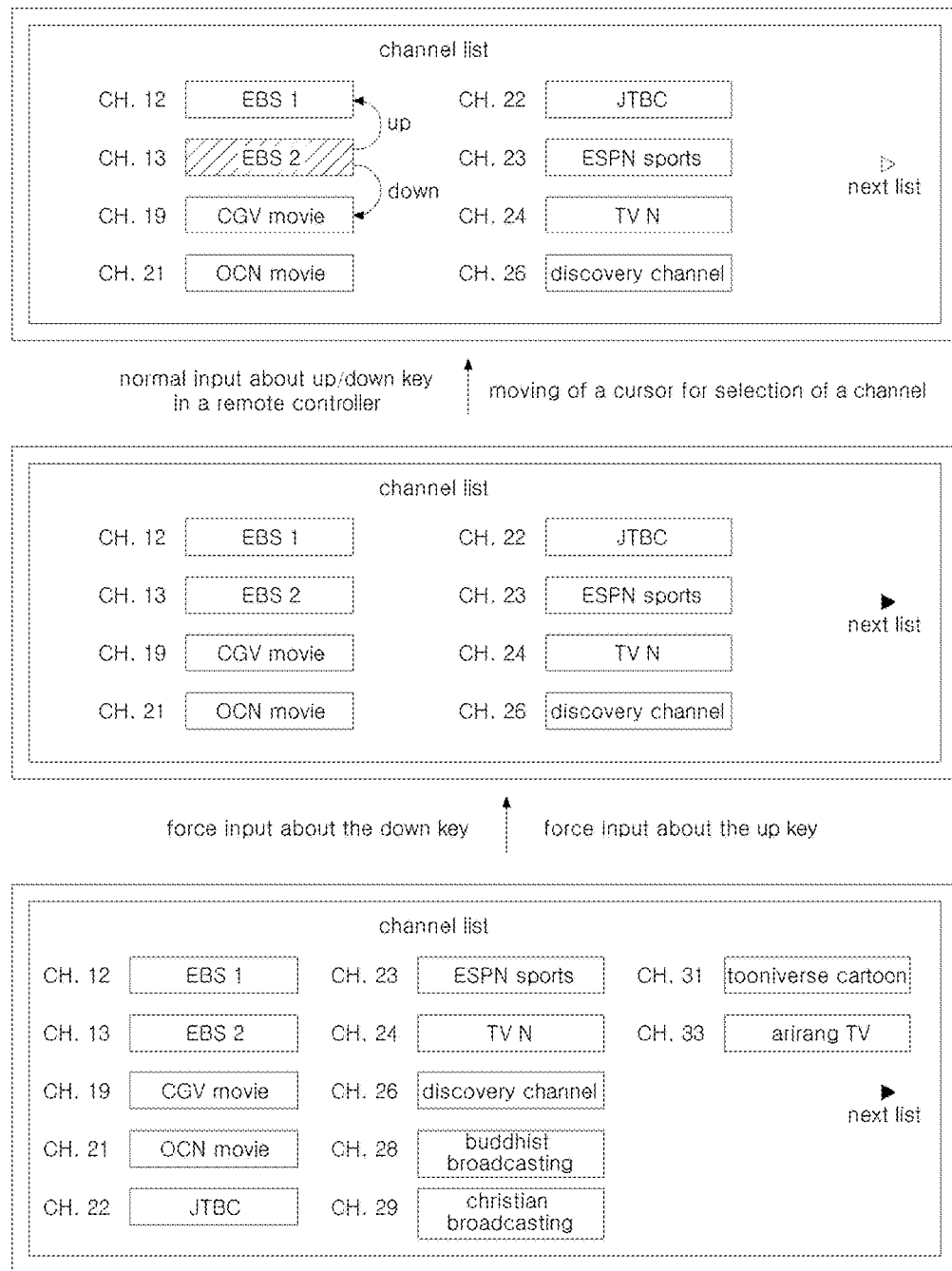
FIG. 6 is a view illustrating a screen of the image processing terminal 200 according to one embodiment of the invention.

FIG. 6 is a view illustrating a screen of the image processing terminal 200 according to one embodiment of the invention.

In FIG. 6, an input corresponding to the sensing level is divided into the normal press and the force press.

As shown in FIG. 6, the image processing terminal 200 may display eight channels in a channel list on the screen when a request of displaying the channel list is received from the remote controller 100.

Here, though the channel list is displayed on the screen, a specific channel is not selected yet.

Subsequently, when the control signal of the up key or the down key is received from the remote controller 100, the image processing terminal 200 determines whether the sensing level in the received control signal corresponds to the normal press or the force press.

If it is determined that the sensing level in the received control signal corresponds to the normal press, the image processing terminal 200 may move a cursor located on the channel list for selecting a specific channel displayed on the screen.

If it is determined that the sensing level in the received control signal corresponds to the force press, the image processing terminal 200 may increase or reduce the number of the channel shown in the channel list.

Subsequently, the image processing terminal 200 may increase the number of the channel displayed on the screen to a predetermined number of the channel in response to the force press on the up key. The image processing terminal 200 may reduce the number of the channel displayed on the screen to a predetermined number of the channel in response to the force press on the down key, while the channel list is displayed on the screen.

The up key and the down key of the directional keys in the remote controller 100 are used in FIG. 6, but the same operations described above may be performed in response to the normal press or the force press on a left key or a right key of the directional keys in the remote controller 100.

Figure 7:
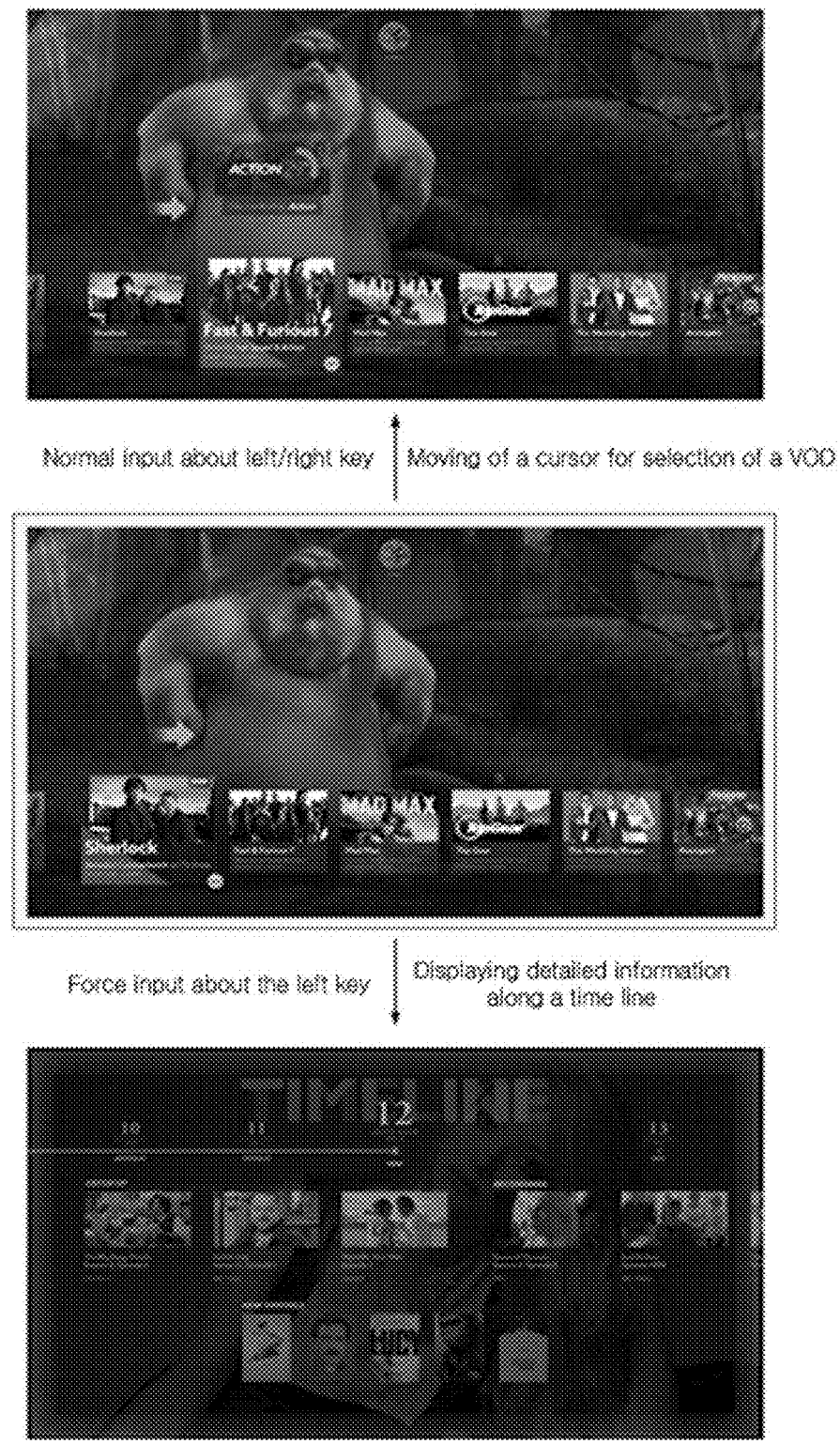
FIG. 7 is a view illustrating a screen of the image processing terminal according to another embodiment of the present invention.

FIG. 7 is a view illustrating a screen of the image processing terminal according to another embodiment of the present invention.

In FIG. 7, an input corresponding to the sensing level is divided into the normal press and the force press.

FIG. 7 illustrates a VOD service screen. When the image processing terminal 200 receives a request for displaying a list of VOD from the remote controller 100 while a VOD is being played back, the image processing terminal 200 may display the list of VOD on a lower portion of the screen as shown in FIG. 7.

Here, the VOD list may include a VOD in the same genre as the VOD being presently played back on the screen, user's favorite VOD or a VOD recently viewed.

A size of the VOD list displayed on a lower portion of the screen may be a size to the extent that the VOD list does not hinder users from watching the VOD being played back on the screen.

If a real time channel (not the VOD) is being broadcasted on the screen, the channel list may be displayed on the lower portion of the screen. The channel list may include a channel in the same genre as a program being currently broadcasted on the screen or a channel in a user's favorite genre, etc.

On the other hand, what the image processing terminal 200 receives a control signal corresponding to the left key or the right key from the remote controller 100 while a specific VOD is selected, the image processing terminal 200 determines whether the sensing level in the received control signal corresponds to the normal press or the force press.

If the received control signal of the left key or the right key is determined to be the normal press, the image processing terminal 200 may move a cursor for selecting a specific VOD displayed on the screen.

If the received control signal of the left key or the right key is determined to be the force press, the image processing terminal 200 may display detailed information about the VOD. Particularly, the image processing terminal 200 may display main scenes of the VOD in accordance with timeline as shown in FIG. 7.

Here, a VOD in the same genre as a selected VOD, another VOD on which the same actors on the VOD appear or a user's favorite VOD may be displayed on the detailed information of the VOD.

Figure 8:
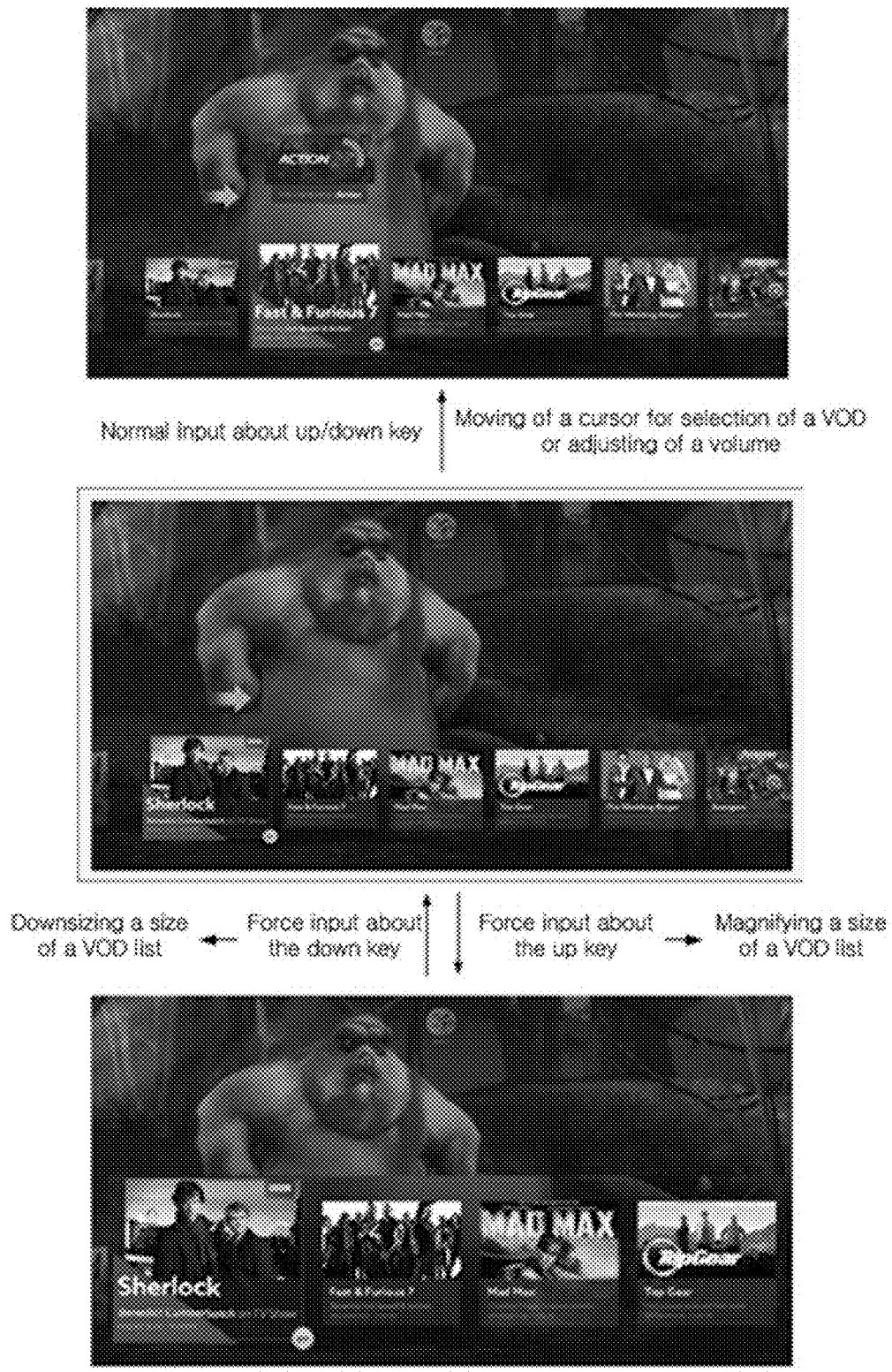
FIG. 8 is a view illustrating a screen of the image processing terminal according to still another embodiment of the invention.

FIG. 8 is a view illustrating a screen of the image processing terminal according to still another embodiment of the invention.

FIG. 8 illustrates a process of adjusting a size of the VOD list displayed on the lower portion of the screen as shown in FIG. 7. An input corresponding to the sensing level is divided into the normal press and the force press.

When the image processing terminal 200 receives the control signal about the up key or the down key from the remote controller 100 while a specific VOD is selected, the image processing terminal 200 determines whether the sensing level in the received control signal corresponds to the normal press or the force press.

If is determined that the control signal of the up key or the down key corresponds to the normal press, the image processing terminal 200 may move a cursor for selecting the VOD.

In another embodiment, the image processing terminal 200 may adjust a volume of the VOD being currently played.

If it is determined that the sensing level in the received control signal of the up key corresponds to the force press, the image processing terminal 200 may increase the size of the VOD list as shown in FIG. 8. The image processing terminal 200 may also display the VOD list whose size is increased on the lower portion of the screen.

Here, the number of VOD list displayed on the screen decreased due to the increased size of the VOD list.

Of course, if the sensing level in the received control signal of the down key is determined to the force press, the image processing terminal 200 may reduce the size of the VOD list and display the VOD list whose size is reduced on the lower portion of the screen. The selected VOD may locate at center among the VOD list.

Here, the number of the VOD list displayed on the screen increases due to the reduced size of the VOD list, and thus arrangement of the VOD list displayed on the lower portion of the screen may be changed.

FIG. 9 is a view illustrating a screen of the image processing terminal according to still another embodiment of the invention.

In FIG. 9, an input corresponding to the sensing level is divided into the normal press and the force press.

In FIG. 9, the cursor moves on a specific VOD of the VOD list displayed on the lower portion of the screen as shown in FIG. 7. When the image processing terminal 200 receives the control signal about the function key 130 from the remote controller, the image processing terminal 200 determines whether the sensing level in the received control signal corresponds to the normal press or the force press.

If it is discriminated that the sensing level corresponds to the normal press, the image processing terminal 200 may display a function setting list related to the playback of contents on the screen.

If it is discriminated that the sensing level corresponds to the force press, the image processing terminal 200 may display one or more other VODs, on which the same actor appearing in a selected VOD appears, on a certain area of the screen as shown in FIG. 9.

Here, the user may select a VOD from the one or more other VODs by using the normal press to the left key or the right key. The user may further request detailed information or playback of the selected VOD.

Figure 10:
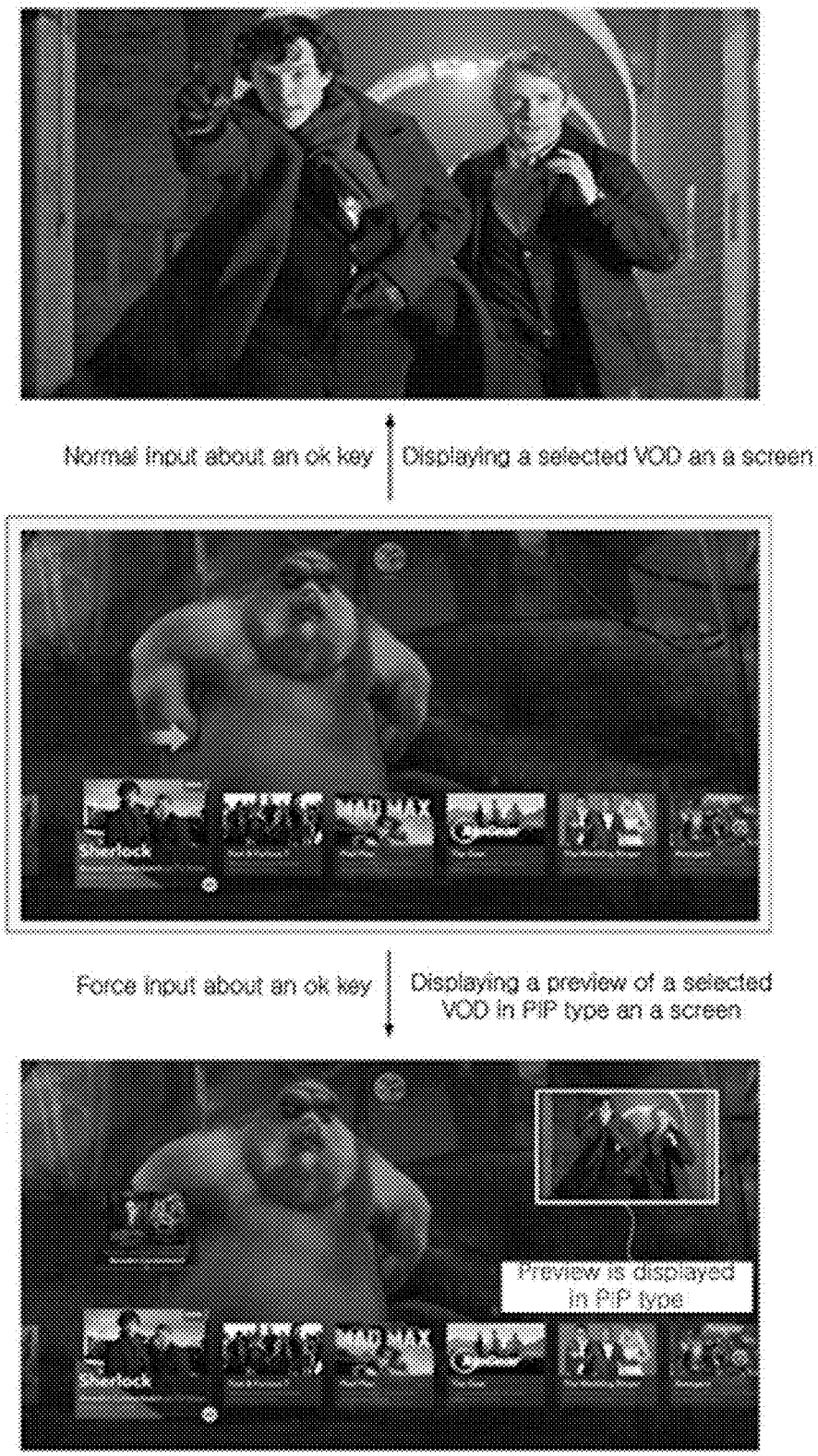
FIG. 10 is a view illustrating a screen of the image processing terminal according to still another embodiment of the invention.

FIG. 10 is a view illustrating a screen of the image processing terminal according to another embodiment of the invention.

In FIG. 10, an input corresponding to the sensing level is divided into the normal press and the force press.

In FIG. 10, a VOD that the user is currently watching is displayed on the screen as a main VOD, and a VOD list is displayed on the lower portion of the screen.

Here, the cursor may move to a specific VOD of the VOD list, and the image processing terminal 200 determines whether the sensing level in the control signal of the determination key 140 (functioning as a OK key) from the remote controller 100 corresponds to the normal press or the force press.

If it is determined that the sensing level corresponds to the normal press, the image processing terminal 200 may display the selected VOD on the screen.

Here, the VOD displayed on the screen may be one of the VOD list.

If it is determined that the sensing level in the control signal corresponds to the force press, the image processing terminal 200 may display a preview of the selected VOD in PIP on a certain area of the screen.

FIG. 11 is a view illustrating a screen of the image processing terminal according to still another embodiment of the invention.

FIG. 11 shows an operation of the image processing terminal 200 according to a sensing level of a home key as the function key 130 while a VOD (or real time channel) is being displayed.

When the image processing terminal 200 receives a control signal of the home key from the remote controller 100, the image processing terminal 200 determines whether the sensing level in a received control signal corresponds to the normal press or the force press.

If it is determined that the sensing level corresponds to the normal press, the image processing terminal 200 may display a general function (e.g., environmental configuration, selectable application, etc.) corresponding to the home key on the screen.

If it is determined that the sensing level corresponds to the force press, the image processing terminal 200 may display a VOD (or channel) recently viewed on the lower portion of the screen.

Figure 12:
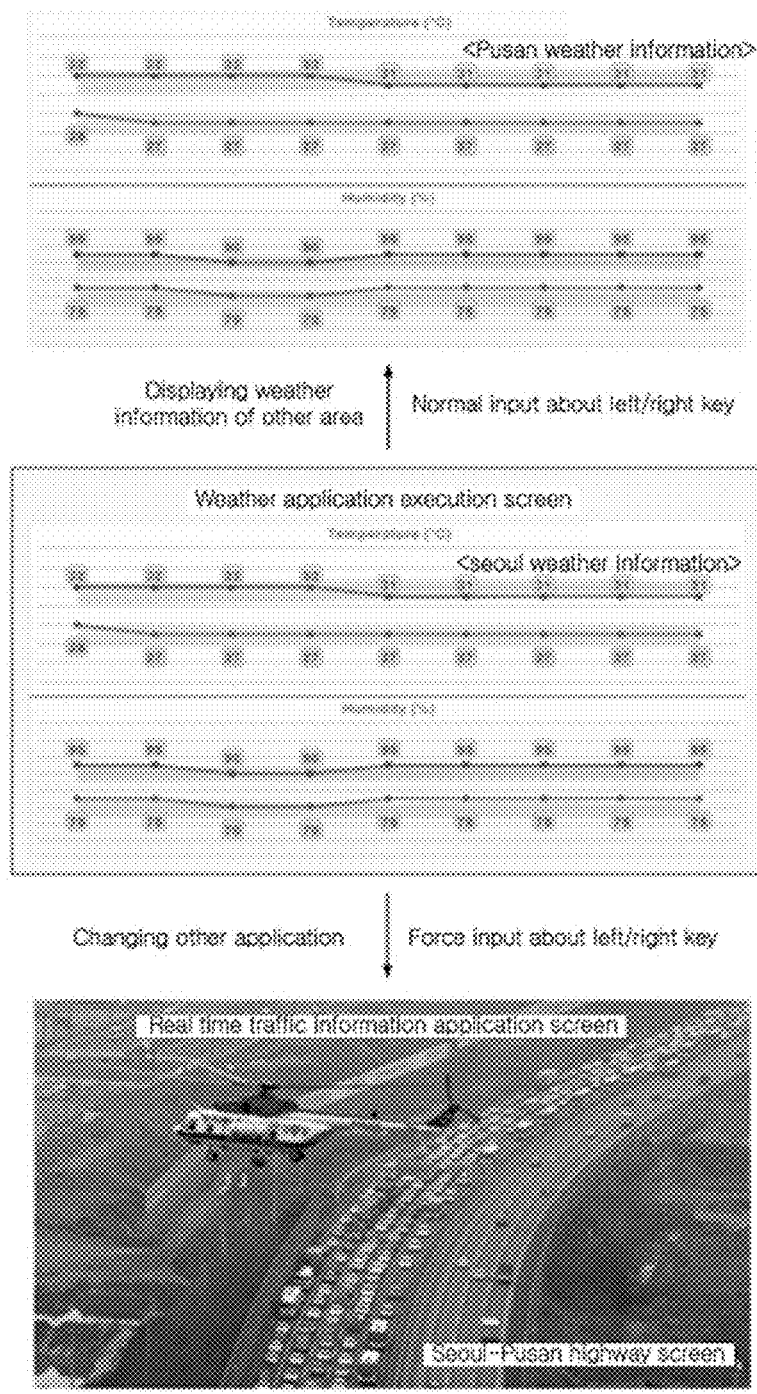
FIG. 12 is a view illustrating a screen of the image processing terminal according to still another embodiment of the invention.

FIG. 12 is a view illustrating a screen of the image processing terminal according to still another embodiment of the invention.

FIG. 12 shows a screen transition from an application to another application in response to the force press.

The image processing terminal 200 may execute an application providing weather forecast and information and display relevant weather forecast on a screen as shown in FIG. 12 when the image processing terminals 200 receives a request for an execution of a weather application from the remote controller 100.

Subsequently, when the image processing terminals 200 receives a control signal of the left key or the right key from the remote controller 100, the image processing terminal 200 determines whether the sensing level in the received control signal corresponds to the normal press or the force press.

If it is determined that the sensing level corresponds to the normal press, the image processing terminal 200 may provide detailed weather forecast and information by region.

Figure 13:
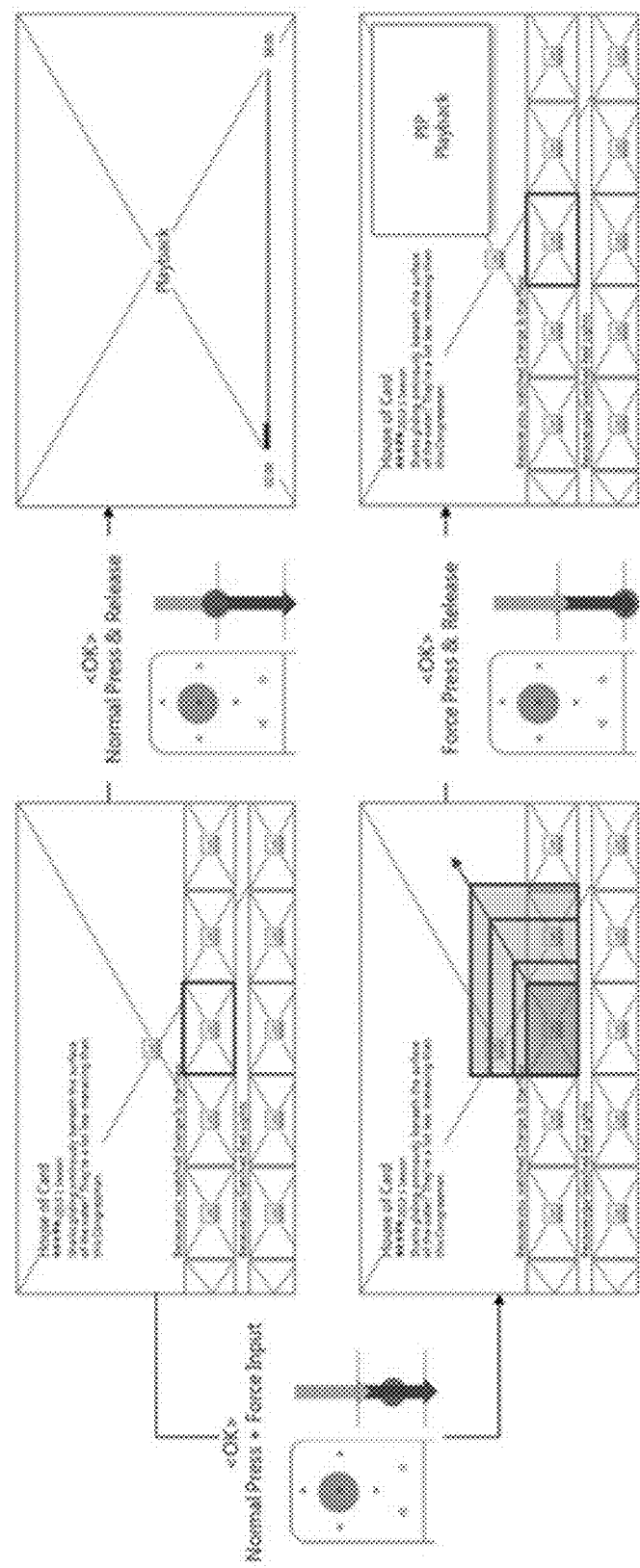
FIG. 13 is a view illustrating a screen of the image processing terminal according to still another embodiment of the invention.

If it is determined that the sensing level corresponds to the force press, the image processing terminal 200 may execute an application providing traffic information and display real-time traffic information on the screen. 1001911 FIG. 13 is a view illustrating a screen of the image processing terminal according to still another embodiment of the invention.

In FIG. 13, an input corresponding to the sensing level is divided into the normal press, the force input and the force press.

FIG. 13 shows a screen for a VOD service. When the image processing terminal 200 receives a request for displaying of a VOD list from the remote controller 100 while a VOD is being played on a screen, the image processing terminal 200 may display the VOD list on the lower portion of the screen as shown in FIG. 13.

When the image processing terminal 200 receives a control signal of the OK key from the remote controller 100 while a cursor locates on a specific VOD, the image processing terminal 200 determines whether the sensing level in the received control signal corresponds to the normal press, the force input or the force press.

In the event that it is determined that the sensing level corresponds to the normal press, the image processing terminal 200 may consider the control signal of the OK key as an operation of playing a VOD and play the VOD on a whole area of the screen as shown in FIG. 13.

If it is determined that the sensing level corresponds to the force input, the image processing terminal 200 may consider the control signal of the OK key as an operation of increasing a size of a VOD and gradually increase the size of the VOD in a VOD list as shown in FIG. 13.

Here, the increasing of the size of the VOD may be adjusted according to a time of the force input to the OK key by the user.

Subsequently, if it is determined that the sensing level corresponds to the force press after the force input, the image processing terminal 200 may consider the control signal of the OK key as an operation of playing the VOD in PIP and play the VOD in PIP on a specific area of the screen while the size of the VOD remains increased.

Figure 14:
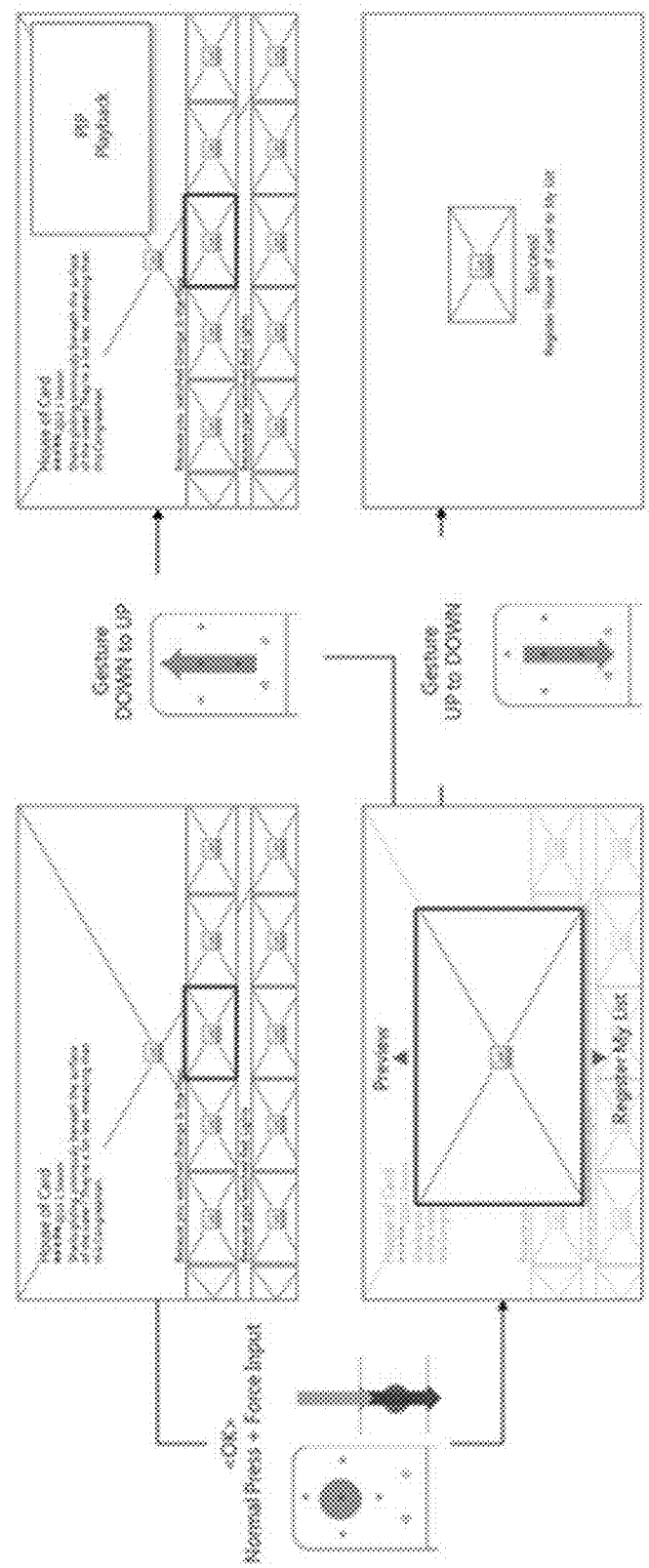
FIG. 14 is a view illustrating a screen of the image processing terminal according to still another embodiment of the invention.

FIG. 14 is a view illustrating a screen of the image processing terminal according to still another embodiment of the invention.

In FIG. 14, an input corresponding to the sensing level is divided into the normal press, the force input and the force press.

An initial screen in FIG. 14 corresponds to the screen for the VOD service in FIG. 13. When the image processing terminal 200 receives a control signal of the OK key from the remote controller 100 while a cursor locates on a specific VOD, the image processing terminal 200 determines whether the sensing level in the received control signal corresponds to the normal press, the force input or the force press.

If it is determined that the sensing level corresponds to the force input, the image processing terminal 200 may consider the control signal of the OK key as an operation for viewing of corresponding VOD or registration of an interest list, and display the VOD whose size is increased on the center of the screen as shown in FIG. 14.

Here, tasks capable of being performed after the VOD may be displayed above or under the VOD whose size is increased.

In FIG. 14, the preview or viewing of the VOD is displayed above the VOD and the registration of the interest list is displayed under the VOD.

Apart from the preview and registration of the interest list, tasks capable of being performed may be displayed on a left side or a right side of the VOD.

Subsequently, the image processing terminal 200 may play the VOD in Picture In Picture (PIP) on a specific area of the screen when a gesture input corresponding to the upward is received from the remote controller 100. The image processing terminal 200 may register the VOD in the interest list when a gesture input corresponding to the downward is received from the remote controller 100. Here, the gesture means an operation of moving the touch means by a specific distance while pressing or touching a specific key with the touch means remains as shown in FIG. 14.

Figure 15:
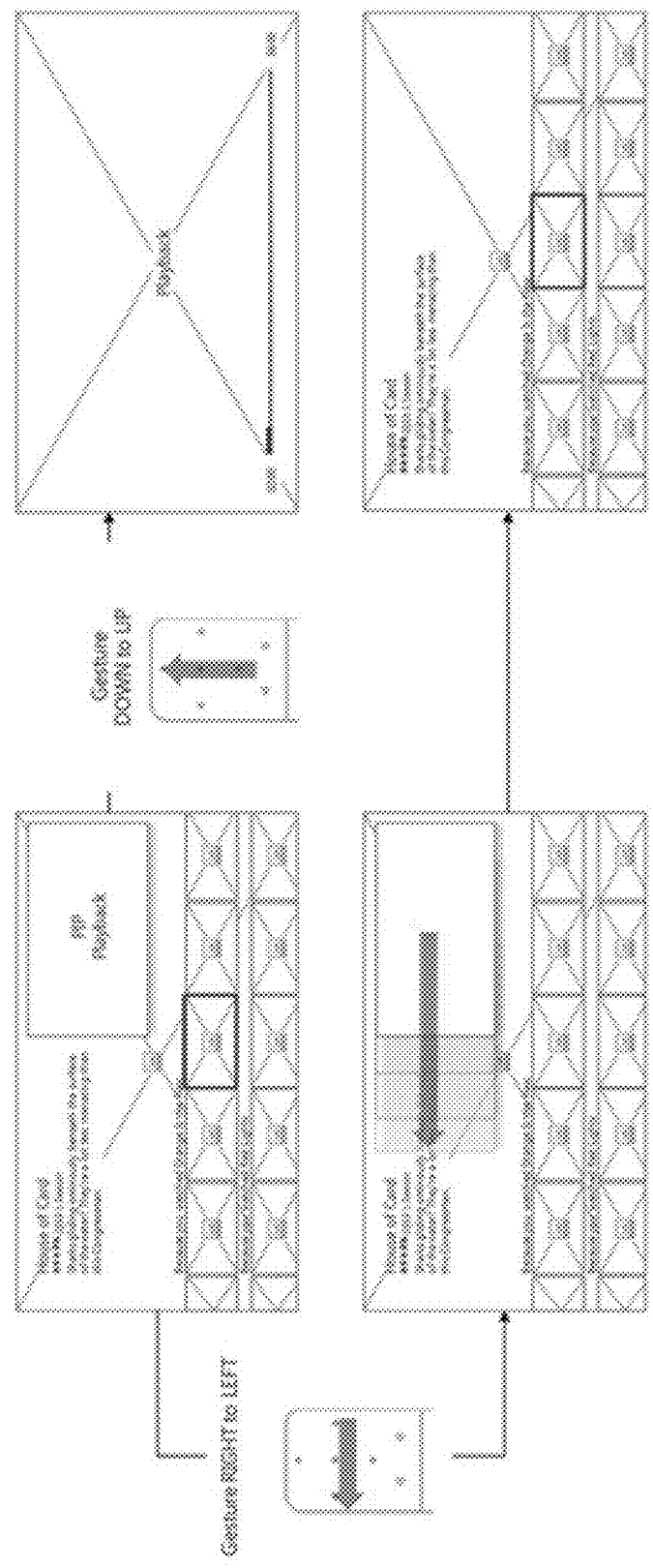
FIG. 15 is a view illustrating a screen of the image processing terminal according to still another embodiment of the invention.

FIG. 15 is a view illustrating a screen of the image processing terminal according to still another embodiment of the invention.

FIG. 15 shows a description of the gesture input. A playback screen of a VOD at which a cursor currently locates out of a VOD list displayed on the screen is displayed in the PIP.

When the gesture input corresponding to the left direction is received from the remote controller 100, the image processing terminal 200 may remove the VOD currently being played in PIP from the screen. The result of the VOD removal is shown in FIG. 15.

When the gesture input corresponding to upward is received from the remote controller 100, the image processing terminal 200 may display the VOD currently being played in PIP on a whole area of the screen.

Figure 16:
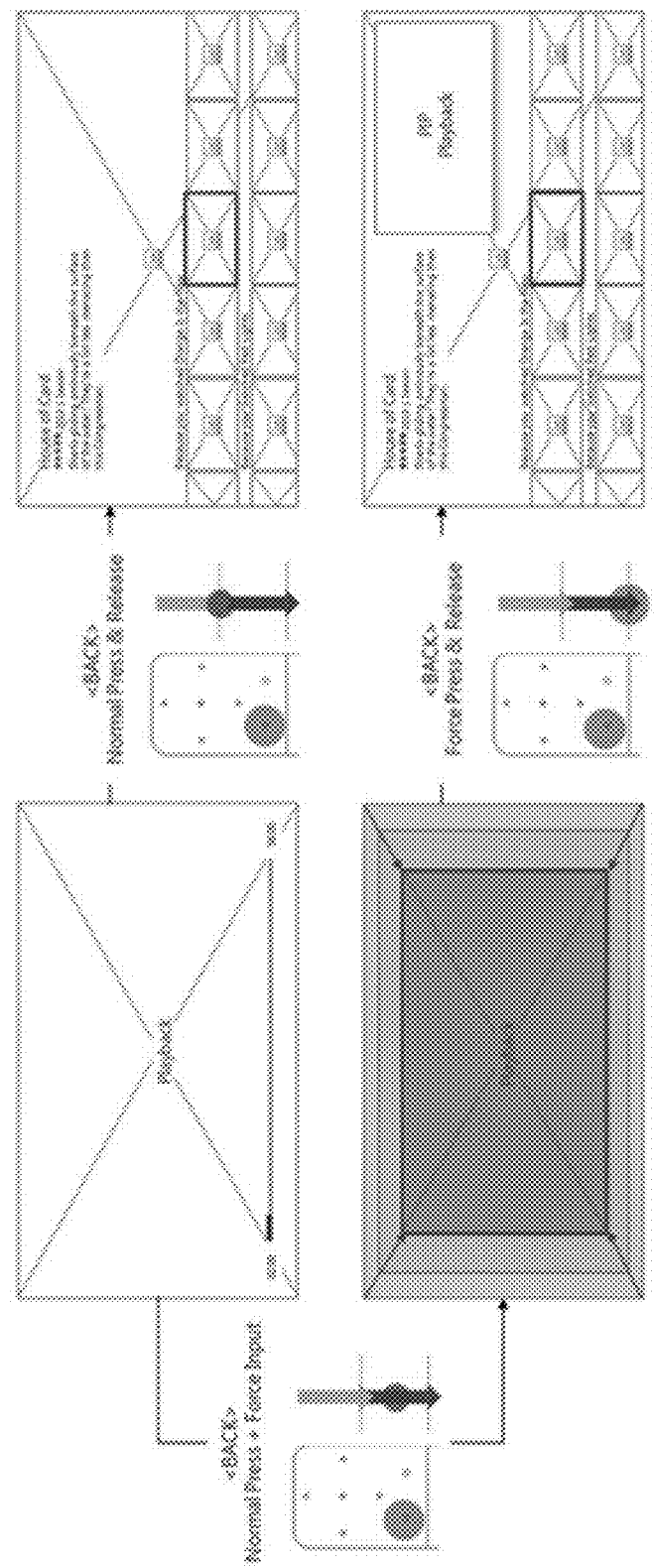
FIG. 16 is a view illustrating a screen of the image processing terminal according to still another embodiment of the invention.

FIG. 16 is a view illustrating a screen of the image processing terminal according to still another embodiment of the invention.

In FIG. 16, an input corresponding to the sensing level is divided into the normal press, the force input and the force press.

FIG. 16 shows an operation of the image processing terminal 200 in response to a control signal of a specific directional key while maintaining an image currently being viewed.

When a control signal of a back key is received from the remote controller 100 while a specific VOD is being played on the screen, the image processing terminal 200 determines whether the sensing level in the received control signal corresponds to the normal press, the force input or the force press.

If it is determined that the sensing level corresponds to the normal press, the image processing terminal 200 may consider the control signal of the back key as an operation of displaying a VOD list and display the VOD list as shown in FIG. 16 while the currently being played VOD is continuously displayed on the screen.

If it is determined that the sensing level corresponds to the force input, the image processing terminal 200 may consider the control signal of the back key as an operation of reducing a size of the VOD and display the VOD by gradually reducing the size of the VOD as shown in FIG. 16.

Here, the currently being played VOD is maintained on the screen though the size of the VOD is reduced.

If it is determined that the sensing level corresponds to the force press after the force input, the image processing terminal 200 may determine the control signal of the back key as an operation of playing the VOD in PIP and play the VOD in PIP on a specific area of the screen while the reduced size of the VOD remains.

Figure 17:
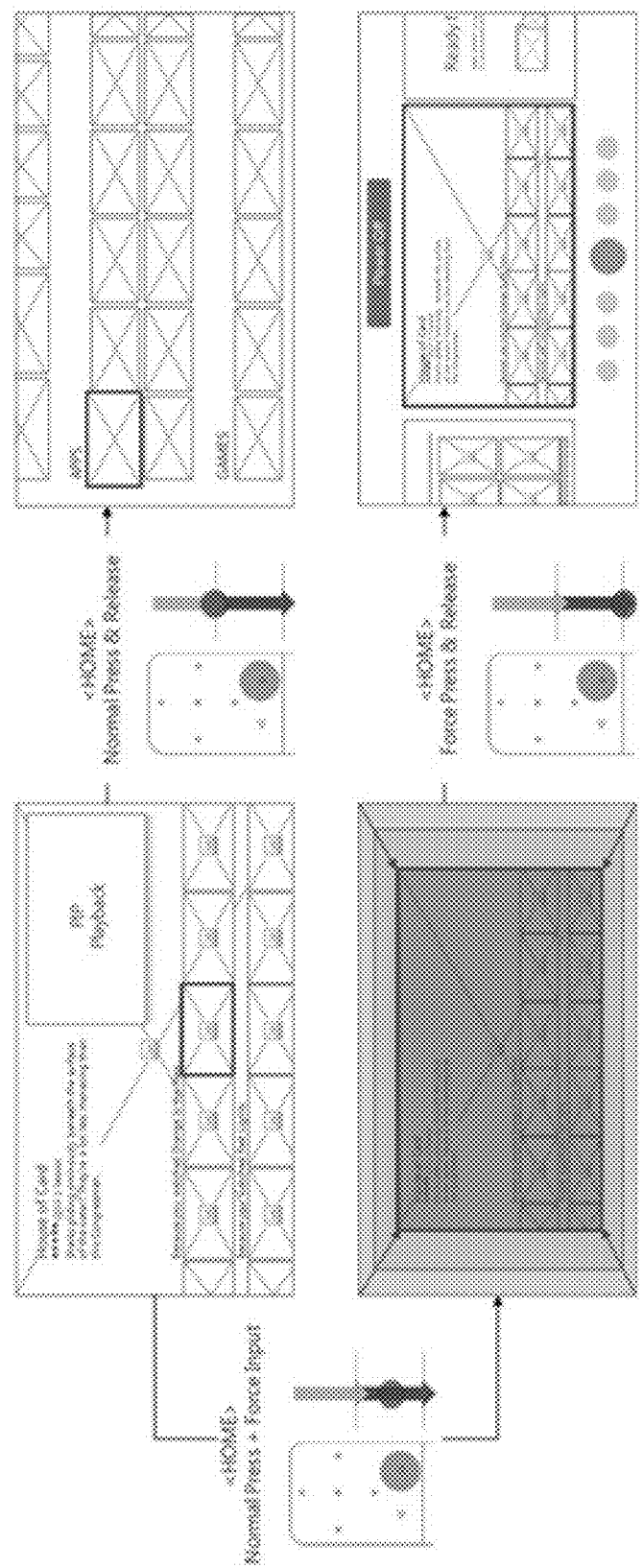
FIG. 17 is a view illustrating a screen of the image processing terminal according to still another embodiment of the invention.

FIG. 17 is a view illustrating a screen of the image processing terminal according to still another embodiment of the invention.

In FIG. 17, the sensing level is divided into the normal press, the force input and the force press.

In FIG. 17, a first VOD is being played back on a whole area of the screen, and a VOD at which a cursor currently locates out of plural VODs is being played in PIP on a specific area of the screen.

When a control signal about the home key is received from the remote controller 100, the image processing terminal 200 determines whether the sensing level in the received control signal corresponds to the normal press, the force input or the force press.

If it is determined that the sensing level corresponds to the normal press, the image processing terminal 200 may consider the control signal about the home key as an operation of displaying a home screen and display a general home screen where an application or a game can be selected as shown in FIG. 17.

If it is determined that the sensing level corresponds to the force input, the image processing terminal 200 may consider the control signal about the home key as an operation of reducing a size of a present screen and reduce the size of the present screen and display the reduced present screen on a center of the screen as shown in FIG. 17.

Subsequently, if it is determined that the sensing level corresponds to the force press after the force input, the image processing terminal 200 may consider the control signal about the home key as an operation of converting a task and display a user interface including a list of tasks capable of being converted to other tasks, not playback of the VOD, on the screen as shown in FIG. 17.

Here, tasks in the list of tasks may include one or more of a task being currently executed at a background and a task, which is not a task being currently executed, executable when the task is selected.

Figure 18:
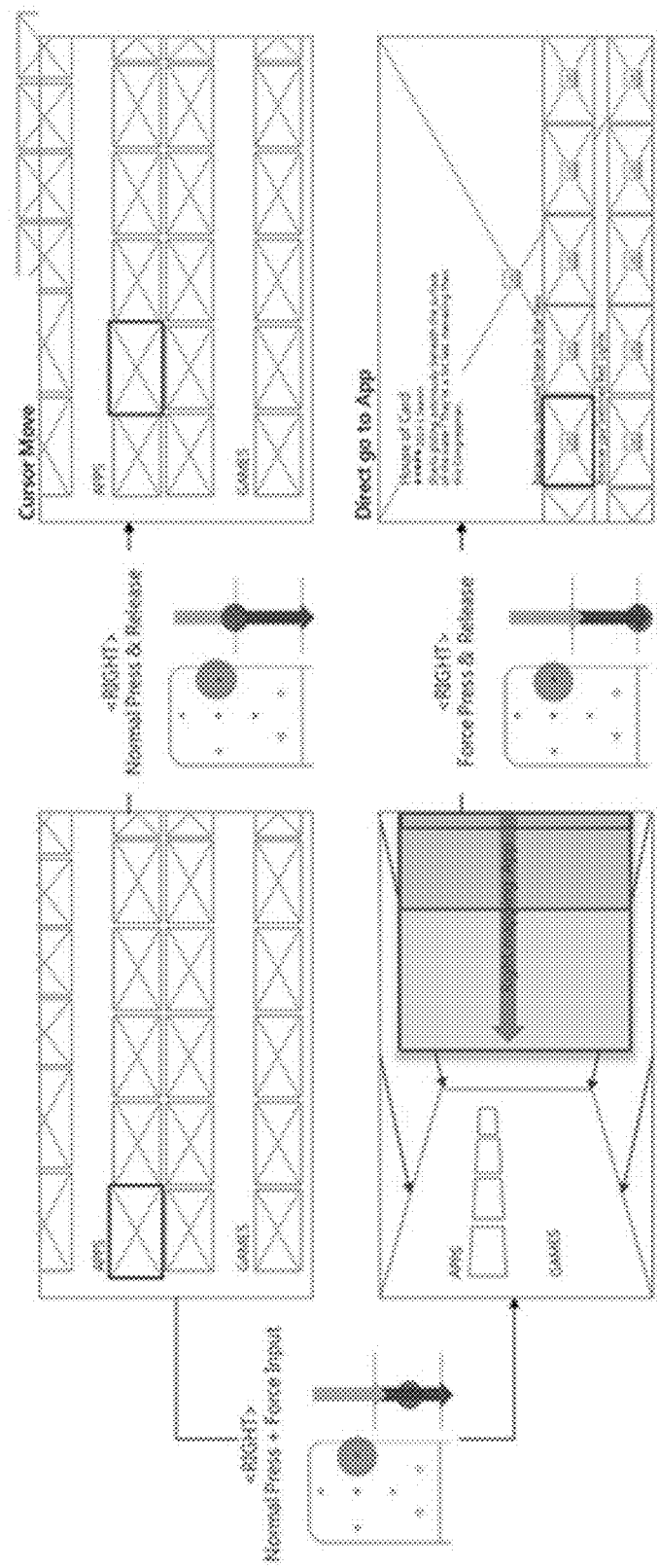
FIG. 18 is a view illustrating a screen of the image processing terminal according to still another embodiment of the invention.

FIG. 18 is a view illustrating a screen of the image processing terminal according to still another embodiment of the invention.

In FIG. 18, an input corresponding to the sensing level is divided into the normal press, the force input and the force press.

FIG. 18 shows a transition between applications. A cursor locates at a specific application of applications displayed on a home screen.

When a control signal about a specific directional key (e.g., the right key) is received from the remote controller 100, the image processing terminal 200 determines whether the sensing level in the received control signal corresponds to the normal press, the force input or the force press.

If it is determined that the sensing level corresponds to the normal press, the image processing terminal 200 may consider the control signal about the right key as an operation of moving a cursor to select an application and move the cursor in the right direction as shown in FIG. 18.

If it is determined that the sensing level corresponds to the force input, the image processing terminal 200 may consider the control signal about the right key as an operation of expressing a process with GUI effect until before the application at which the cursor currently locates is executed. The image processing terminal 200 may express the GUI effect of an entrance into a screen by moving the application at which the cursor currently locates from the right direction to the left direction while moving a present screen to the left direction with a three dimensional effect as shown in FIG. 18.

Subsequently, if it is determined that the sensing level corresponds to the force press after the force input, the image processing terminal 200 may consider the control signal about the right key as an operation of executing an application. The image processing terminal 200 may display an execution result of an application at which the cursor currently locates on the screen.

In addition, the playback speed of contents or VOD, moving speed of the cursor, moving speed of a highlight region varies depending on the normal press, the force input or the force press.

In another embodiment, at least one of the operations including changing the moving speed or the playback speed, enlarging or reducing the object, performing the preview or playback of contents in PIP, increasing or reducing the number of the list, displaying the detailed information related to a specific list, displaying other VODs or contents related to the actor in on VOD or content, displaying the content list recently viewed, changing the moving speed of the cursor, magnifying or reducing contents, magnifying or reducing the UI, or displaying the traffic information is performed when the force press is inputted to the remote controller. Here, an operation executed when the force press is inputted to one of the navigation key, the determination key or the function key may be different from an operation executed when the force press is inputted to another key.

The operation including changing the moving speed or the playback speed, magnifying or reducing the object, performing the preview or playback of contents in PIP, increasing or reducing the number of the list, displaying the detailed information related to a specific list, displaying other contents related to the actor in one content, displaying the object list recently viewed, changing the playback speed, changing the moving speed of the cursor, magnifying or reducing contents, magnifying or reducing the UI or displaying the traffic information may be performed when the force press is inputted to the remote controller in response to the gesture.

Additionally, a plurality of operations corresponding to selected keys may be performed in response to the gesture.

As described above, the image processing terminal 200 changes an object displayed on the screen and display the changed object in response to types of the task displayed on a present screen (i.e., an operation, the key received from the remote controller 100) and the sensing level of the key (e.g., normal press, force input or force press). The image processing terminal 200 performs different functions (e.g., transition of the application, scene transition of contents, etc) in response to the sensing level about the same key. As a result, the user can use easily and conveniently various services by using the remote controller having few or no key.

Components described in the embodiments above can be easily understood from the perspective of processes.

That is, each component can also be understood as an individual process. Likewise, processes in the embodiments described above can be easily understood from the perspective of components.

Also, the technical features described above can be implemented in the form of program instructions capable of being performed by means of various computer means and can be recorded in a computer-readable medium.

Such a computer-readable medium can include program instructions, data files, data structures, etc., alone or in combination.

The program instructions recorded on the medium can be designed and configured specifically for the present invention or can be a type of medium known to and used by the skilled person in the field of computer software.

Examples of the computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc.

Examples of the program instructions may include not only machine language codes produced by a compiler but also high-level language codes that can be executed by a computer through the use of an interpreter, etc.

The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

DESCRIPTION OF REFERENCE NUMBERS

100: remote controller
110: body
120: navigation key
130: function key
140: determination key
200: image processing terminal
210: processor
220: memory
230: communication unit

What is claimed is:

1. An image processing terminal, comprising:
a processor;
a memory connected to the processor; and
a communication unit configured to receive a control signal from a remote controller in response to a selection of a key by a user,
wherein one or more programs are stored in the memory and configured to be executed by the processor, the programs including instructions for determining whether a sensing level of the key in the received control signal corresponds to a normal press or a force press and executing a control command corresponding to the normal press or the force press, and
in response to the force press being inputted to the remote controller, the processor performs at least one of change of an object displayed on a screen or a scene transition of contents,
and wherein an operation of the image processing terminal when a normal press is inputted to the remote controller is different from an operation of the image processing terminal when the force press is inputted to the remote controller, and
an input corresponding to the sensing level includes the normal press and the force press, the force press being an input corresponding to a coordinate value that exceeds a scope of a coordinate value or the coordinate value corresponding to a sensing level of the normal press as further pressure is applied to the key while pressing or touching the key still remains after the normal press.

2. The image processing terminal of claim 1, wherein the input corresponding to the sensing level further includes a force input,
the force input is an input corresponding to a coordinate value that exceeds a scope of a coordinate value or the coordinate value corresponding to a sensing level of the normal press as further pressure is applied to the key while pressing or touching the key still remains after the force input, and
the force press is an input corresponding to a coordinate value that exceeds a scope of a coordinate value or the coordinate value corresponding to a sensing level of the force input as further pressure is applied to the key while pressing or touching the key still remains after the force input, and
the programs include instructions for activating the force press when the force input is applied.

3. The image processing terminal of claim 1, wherein the coordinate value includes a value of pressure corresponding to each of a coordinate (x), a coordinate (y) and a coordinate (z) of the key as the user presses or touches the key of the remote controller,
the sensing level of the key is determined based on a value corresponding to the coordinate (z), and
the programs include instructions, executable by the processor, for reflecting at least one of a time during which the user presses or touches the key or an area of the key pressed or touched by the user when determining the sensing level of the key.

4. The image processing terminal of claim 2, wherein, when the sensing level of the key is the force input, a Graphic User Interface (GUI) effect includes one or more operations of increasing or reducing a size of an object at which a cursor locates, performing a specific function related to the object, making a transition between objects so that another object is executed while one object is being executed, or displaying a user interface which converts a task displayed on a screen into another task.

5. The image processing terminal of claim 1, wherein, when the force press is inputted to the remote controller, the processor executes one or more operations of displaying a preview of contents or playing contents in Picture In Picture (PIP), increasing or reducing a number of a list, displaying a detailed information related to a specific list, displaying a list of Video on Demand (VOD) in which same actor appears, displaying a list of contents recently viewed, displaying a traffic information, adjusting a play speed, adjusting a speed of a cursor movement, magnifying or reducing contents, or magnifying or reducing an user interface.

6. The image processing terminal of claim 1, wherein the communication unit receives a control signal of a gesture input that sequentially touches plural keys of the remote controller in a specific direction, and
the programs include instructions, executable by the processor, for executing a control command corresponding to the control signal of the gesture input.

7. An image processing terminal, comprising:
a processor;
a memory connected to the processor; and
a communication unit configured to receive a control signal from a remote controller in response to a selection of a key by a user,
wherein one or more programs are stored in the memory and configured to be executed by the processor, the programs including instructions for determining whether a sensing level of the key in the received control signal corresponds to a normal press or a force press and executing a control command corresponding to the normal press or the force press, and
in response to the force input or the force press being inputted to the remote controller, the processor gradually magnifies an object displayed on a screen so that a change of Graphic User Interface (GUI) is shown and performs a preview or a playback of contents related to the object, and wherein an operation of the image processing terminal when a normal press is inputted to the remote controller is different from an operation of the image processing terminal when the force press is inputted to the remote controller, an input corresponding to the sensing level includes the normal press and the force input or the force press, the force input and the force press being an input pressing or touching a key with higher pressure or wider area than the normal press, and a sensing level corresponding to the force input is different from a sensing level corresponding to the force press.

8. An image processing terminal, comprising:
a processor;
a memory connected to the processor; and
a communication unit configured to receive a control signal from a remote controller in response to a selection of a key by a user,
wherein one or more programs are stored in the memory and configured to be executed by the processor, the programs including instructions for executing a control command according to a control signal of the key received from the remote controller, and
in response to a force press being inputted to the remote controller, the processor executes at least one of change of an object displayed on a screen or a scene transition of contents,
and wherein the remote controller includes two or more of a navigation key, a determination key and a function key, an operation executed by the processor when a force press is inputted to one of the keys is different from an operation executed by the processor when the force press is inputted to another key other than the keys, and
the force press is an input pressing or touching a key with higher pressure or wider area than a normal press.

9. An image processing terminal, comprising:
a processor;
a memory connected to the processor; and
a communication unit configured to receive a control signal from a remote controller in response to a selection of a key by a user,
wherein one or more programs are stored in the memory and configured to be executed by the processor, the programs including instructions for playing a content at which a cursor locates among plural contents in Picture In Picture (PIP) on a specific area of a screen when a sensing level of the key is determined to be a force press from the control signal received from the remote controller,
an input corresponding to the sensing level of the key includes a normal press and the force press, and
the force press is an input corresponding to a coordinate value that exceeds a scope of a coordinate value or the coordinate value corresponding to a sensing level of the normal press according as further pressure is applied to the key while pressing or touching the key still remains after the normal press.

10. An image processing terminal, comprising:
a processor;
a memory connected to the processor; and
a communication unit configured to receive a control signal from a remote controller in response to a selection of a key by a user,
wherein one or more programs are stored in the memory and configured to be executed by the processor, the programs including:

instructions for increasing a size of content at which a cursor locates among plural contents displayed on a screen when a sensing level of the key is determined to be a force input from a first control signal of the key received from the remote controller; and instructions for playing the content in Picture In Picture (PIP) on a specific area of the screen while the size of the content remains increased when a sensing level of the key is determined to be a force press from a second control signal received from the remote controller, and wherein an input corresponding to the sensing level of the key includes a normal press, the force input and the force press, the force input is an input corresponding to a coordinate value that exceeds a scope of a coordinate value or the coordinate value corresponding to a sensing level of the normal press as further pressure is applied to the key while pressing or touching the key still remains after the normal press, and the force press is an input corresponding to a coordinate value that exceeds a scope of a coordinate value or the coordinate value corresponding to a sensing level of the force input as further pressure is applied to the key while pressing or touching the key still remains after the force input.

11. The image processing terminal of claim 10, wherein the key corresponding to the first control signal is identical to the key corresponding to the second control signal.

12. The image processing terminal of claim 10, wherein the programs further include instructions for increasing the size of the contents between plural contents displayed on the screen.

13. An image processing terminal, comprising:
a processor;
a memory connected to the processor; and
a communication unit configured to receive a control signal from a remote controller in response to a selection of a key by a user,
wherein one or more programs are stored in the memory and configured to be executed by the processor, the programs including:
instructions for increasing a size of content at which a cursor locates among plural contents displayed on a screen when a sensing level is determined to be a force input from a first control signal of the key received from the remote controller,
instructions for displaying an executable operation above, under, on a right side or on a left side around the content whose size is increased, and
instructions for executing a control command corresponding to the control signal of a gesture input when a second control signal received from the remote controller is determined to be the gesture input that sequentially touches plural keys of the remote controller in a specific direction while the size of the content remains increased,
and wherein an input corresponding to the sensing level of the key includes a normal press, the force input and a force press,
the force input is an input corresponding to a coordinate value that exceeds a scope of a coordinate value or the coordinate value corresponding to a sensing level of the normal press as further pressure is applied to the key while pressing or touching the key still remains after the normal press, and
the force press is an input corresponding to a coordinate value that exceeds a scope of a coordinate value or the coordinate value corresponding to a sensing level of the force input as further pressure is applied to the key while pressing or touching the key still remains after the force input.

14. The image processing terminal of claim 13, wherein the programs further include instructions for playing back the content whose size is increased in Picture In Picture (PIP) on a specific area of the screen when the gesture input corresponds to the upward, and adding the content whose size is increased to an interest list when the gesture input corresponds to the downward.

15. The image processing terminal of claim 14, wherein the programs further include:
   instructions for executing a control command corresponding to a third control signal received from the remote controller when the third control signal relates to the gesture input while the content are being played back in the PIP,
   instructions for stopping the playback of the content played in the PIP and removing the content from the screen when the gesture input is inputted in the left direction, and
   instructions for playing the content on an whole area of the screen when the gesture input is inputted upward.

16. The image processing terminal of claim 15, wherein the programs further include instructions for locating the cursor at the removed content among plural contents on the screen.

17. An image processing terminal comprising:
   a processor;
   a memory connected to the processor; and
   a communication unit configured to receive a control signal from a remote controller in response to a selection of a key by a user,
   wherein one or more programs are stored in the memory and configured to be executed by the processor, the programs including:
   instructions for reducing a size of content being played on a screen and displaying the content whose size is reduced when a sensing level of the key is determined to be a force input from a first control signal received from the remote controller, and
   instructions for playing back the content whose size is reduced in Picture In Picture (PIP) on a specific area of the screen when a sensing level of the key is determined to be a force press from a second control signal received from the remote controller,
   and wherein an input corresponding to the sensing level of the key includes a normal press, the force input and the force press,
   the force input is an input corresponding to a coordinate value that exceeds a scope of a coordinate value or the coordinate value corresponding to a sensing level of the normal press as further pressure is applied to the key while pressing or touching the key still remains after the normal press, and
   the force press is an input corresponding to a coordinate value that exceeds a scope of a coordinate value or the coordinate value corresponding to a sensing level of the force input as further pressure is applied to the key while pressing or touching the key still remains after the force input.

18. An image processing terminal comprising:
   a processor;
   a memory connected to the processor; and
   a communication unit configured to receive a control signal from a remote controller in response to a selection of a key by a user,
   wherein one or more programs are stored in the memory and configured to be executed by the processor, the programs including:
   instructions for reducing a size of a task displayed on a screen when a sensing level of a key is determined to be a force input from a first control signal received from the remote controller, and
   instructions for displaying a user interface for converting the task to another task while the size of the task remains reduced when the sensing level of the key is determined to be a force press from a second control signal received from the remote controller,
   and wherein an input corresponding to the sensing level of the key includes a normal press, the force input and the force press,
   the force input is an input corresponding to a coordinate value that exceeds a scope of a coordinate value or the coordinate value corresponding to a sensing level of the normal press as further pressure is applied to the key while pressing or touching the key still remains after the normal press, and
   the force press is an input corresponding to a coordinate value that exceeds a scope of a coordinate value or the coordinate value corresponding to a sensing level of the force input as further pressure is applied to the key while pressing or touching the key still remains after the force input.

19. An image processing terminal comprising:
   a processor;
   a memory connected to the processor; and
   a communication unit configured to receive a control signal from a remote controller in response to a selection of a key by a user,
   wherein one or more programs are stored in the memory and configured to be executed by the processor, the programs including:
   instructions for displaying a scene transition showing a process until before a specific application is executed on a screen where plural applications are displayed when a sensing level of a specific key is determined to be a force input from a first control signal received from the remote controller, while a cursor locates at the specific application among the plural applications displayed on the screen, and
   instructions for displaying an execution result of the specific application on the screen when the sensing level of the specific key is determined to be a force press from a second control signal received from the remote controller,
   and wherein an input corresponding to the sensing level of the key includes a normal press, the force input and the force press,
   the force input is an input corresponding to a coordinate value that exceeds a scope of a coordinate value or the coordinate value corresponding to a sensing level of the normal press as further pressure is applied to the key while pressing or touching the key still remains after the normal press, and
   the force press is an input corresponding to a coordinate value that exceeds a scope of a coordinate value or the coordinate value corresponding to a sensing level of the force input as further pressure is applied to the key while pressing or touching the key still remains after the force input.

20. A method for providing contents or services through an image processing terminal, the method comprising:
- receiving a control signal including a sensing level of a key from a remote controller;
- determining whether the sensing level of the key corresponds to a normal press or a force press; and
- executing a control command corresponding to the normal press or the force press,
- wherein at least one of change of an object displayed on a screen or scene transition of content is executed in response to the control command when a force press is inputted to the remote controller,
- and wherein an operation of the image processing terminal when a normal press is inputted to the remote controller is different from an operation of the image processing terminal when the force press is inputted to the remote controller,
- an input corresponding to the sensing level includes the normal press and the force press, and
- the force press is an input corresponding to a coordinate value that exceeds a scope of a coordinate value or the coordinate value corresponding to a sensing level of the normal press as further pressure is applied to the key while pressing or touching the key still remains after the normal press.

21. A computer program stored in a recording medium including instructions for performing the method of claim 20.

* * * * *